US010359290B2

(12) United States Patent
Felix et al.

(10) Patent No.: US 10,359,290 B2
(45) Date of Patent: Jul. 23, 2019

(54) METHOD AND APPARATUS FOR TWO DIMENSIONAL EDGE-BASED MAP MATCHING

(71) Applicant: NAVTEQ B.V., Veldhoven (NL)

(72) Inventors: Macgregor Felix, Veldhoven (NL); Senthil Natesan, Bartlett, IL (US); Trent Williams, Veldhoven (NL)

(73) Assignee: HERE Global B.V., Veldhoven (NL)

( * ) Notice: Subject to any disclaimer, the term of this patent is extended or adjusted under 35 U.S.C. 154(b) by 462 days.

(21) Appl. No.: 13/849,238

(22) Filed: Mar. 22, 2013

(65) Prior Publication Data
US 2014/0289267 A1    Sep. 25, 2014

(51) Int. Cl.
*G01C 21/00* (2006.01)
*G01C 21/32* (2006.01)
*G01C 21/30* (2006.01)
*G01C 21/26* (2006.01)
*G01C 21/20* (2006.01)
*G01C 21/28* (2006.01)

(52) U.S. Cl.
CPC .............. *G01C 21/32* (2013.01); *G01C 21/26* (2013.01); *G01C 21/30* (2013.01); *G01C 21/20* (2013.01); *G01C 21/28* (2013.01)

(58) Field of Classification Search
CPC  G01C 21/32; G01C 21/3602; G01C 21/3635; G01C 21/26; G01C 21/28; G06T 11/00
USPC ....... 701/400, 408, 410, 411, 412, 417, 426, 701/430, 461, 468, 472, 517, 532, 533; 707/758
See application file for complete search history.

(56) References Cited

U.S. PATENT DOCUMENTS

| 2008/0004804 | A1  | 1/2008  | Fujita et al. |
| 2008/0071465 | A1* | 3/2008  | Chapman ........... G01C 21/3691 701/117 |
| 2010/0034426 | A1* | 2/2010  | Takiguchi et al. ............ 382/106 |
| 2010/0305850 | A1* | 12/2010 | Krumm .................. G01C 21/32 701/532 |

(Continued)

FOREIGN PATENT DOCUMENTS

| EP | 2 120 015 A2 | 11/2009 |
| EP | 2 224 210 A2 | 9/2010  |

(Continued)

OTHER PUBLICATIONS

S. Schroedl et al., "Mining GPS Traces for Map Refinement," Journal, Data Mining and Knowledge Discovery, Jul. 2004, vol. 9, Issue 1, pp. 59-87.

*Primary Examiner* — Mark D Featherstone
*Assistant Examiner* — Diedra McQuitery
(74) *Attorney, Agent, or Firm* — Ditthavong & Steiner, P.C.

(57) ABSTRACT

Two-dimensional (2D) edge-based map matching includes using a 2D edge-based map matching platform. The 2D edge-based map matching platform receives at least one request to match a probe data point to one of a plurality of thoroughfare segments. Next, the 2D edge-based map matching platform determines respective edges of the plurality of thoroughfare segments and causes a matching of the probe data point to the one thoroughfare segment based on a comparison of the probe data point to the respective edges of the plurality of thoroughfare segments.

14 Claims, 16 Drawing Sheets

(56) References Cited

U.S. PATENT DOCUMENTS

| | | | | |
|---|---|---|---|---|
| 2011/0106416 A1* | 5/2011 | Scofield | ............... | G08G 1/0104 |
| | | | | 701/119 |
| 2011/0261076 A1* | 10/2011 | Shinohara | ............... | A63F 13/10 |
| | | | | 345/650 |
| 2011/0313648 A1* | 12/2011 | Newson | ................. | G01C 21/30 |
| | | | | 701/447 |
| 2012/0209518 A1* | 8/2012 | Nowak | ................ | G01C 15/002 |
| | | | | 701/445 |
| 2013/0328924 A1* | 12/2013 | Arikan | .................... | G06T 11/20 |
| | | | | 345/629 |
| 2014/0141796 A1* | 5/2014 | Marti et al. | ................. | 455/456.1 |

FOREIGN PATENT DOCUMENTS

| | | |
|---|---|---|
| EP | 2 269 883 A1 | 1/2011 |
| EP | 2 413 301 A1 | 2/2012 |
| JP | 2004-226341 A | 8/2004 |

\* cited by examiner

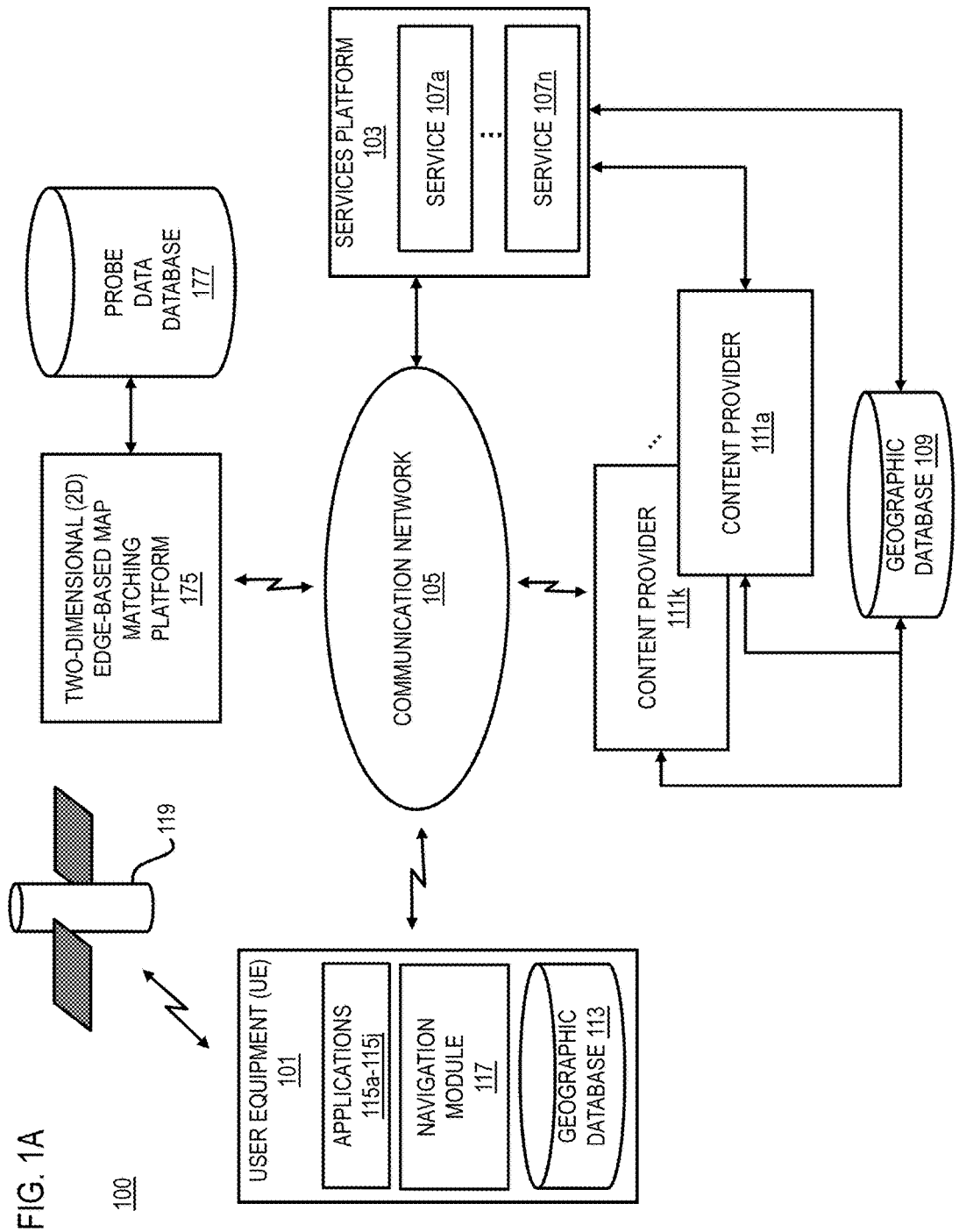

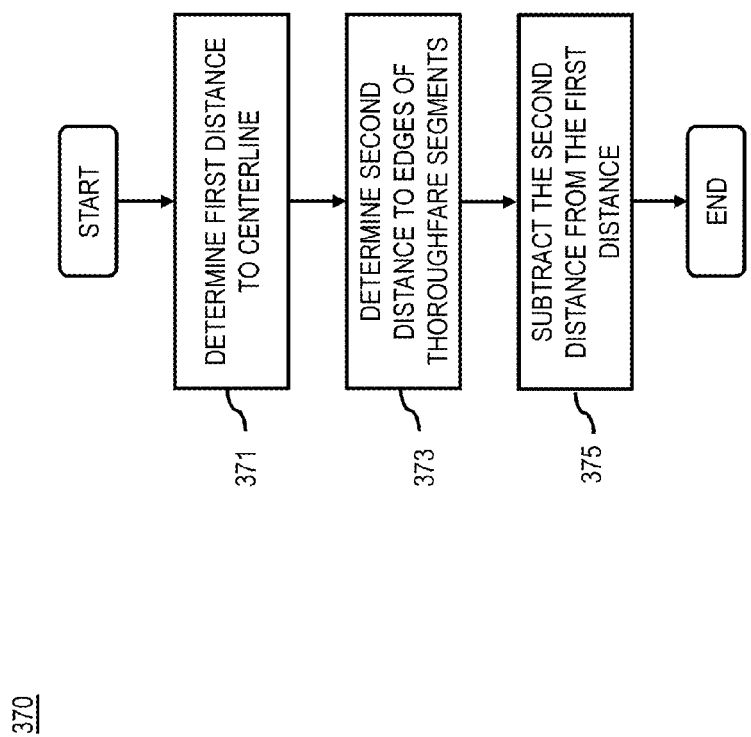

METHOD AND APPARATUS FOR TWO DIMENSIONAL EDGE-BASED MAP MATCHING

BACKGROUND

Service providers and device manufacturers (e.g., wireless, cellular, etc.) are continually challenged to deliver value and convenience to consumers by, for example, providing compelling network services. Many of these services rely on accurately knowing the position of these consumers in order to match them to map data. However, positioning data is inaccurate due to errors caused by technical as well as environmental factors. Thus, map matching requires repositioning the inaccurate probe data in order to match it to the correct map features. For services such as route navigation, the probe data point must be repositioned to the correct thoroughfare segment (e.g., road). Map matching based solely on proximity to the centerlines of thoroughfare segments is particularly susceptible to error and ambiguity because it does not take into account the physical extent of those segments. Accordingly, service provider and device manufacturers face significant technical challenges associated with mapping probe data points to thoroughfare segments.

SOME EXAMPLE EMBODIMENTS

Therefore, there is a need for an approach for two dimensional (2D) edge-based map matching.

According to one embodiment, a method comprises receiving at least one request to match at least one probe data point to one of a plurality of thoroughfare segments. The method also comprises determining respective edges of the plurality of thoroughfare segments. The method further comprises causing, at least in part, a matching of the at least one probe data point to the one thoroughfare segment based, at least in part, on a comparison of the at least one probe data point to the respective edges of the plurality of thoroughfare segments.

According to another embodiment, an apparatus comprises at least one processor, and at least one memory including computer program code for one or more computer programs, the at least one memory and the computer program code configured to, with the at least one processor, cause, at least in part, the apparatus to receive at least one request to match at least one probe data point to one of a plurality of thoroughfare segments. The apparatus is also caused to determine respective edges of the plurality of thoroughfare segments. The apparatus is also caused to match the at least one probe data point to the one thoroughfare segment based, at least in part, on a comparison of the at least one probe data point to the respective edges of the plurality of thoroughfare segments.

According to another embodiment, a computer-readable storage medium carries one or more sequences of one or more instructions which, when executed by one or more processors, cause, at least in part, an apparatus to receive at least one request to match at least one probe data point to one of a plurality of thoroughfare segments. The apparatus is also caused to determine respective edges of the plurality of thoroughfare segments. The apparatus is also caused to match the at least one probe data point to the one thoroughfare segment based, at least in part, on a comparison of the at least one probe data point to the respective edges of the plurality of thoroughfare segments.

According to another embodiment, an apparatus comprises means for receiving at least one request to match at least one probe data point to one of a plurality of thoroughfare segments. The apparatus also comprises means for determining respective edges of the plurality of thoroughfare segments. The apparatus further comprises means for causing, at least in part, a matching of the at least one probe data point to the one thoroughfare segment based, at least in part, on a comparison of the at least one probe data point to the respective edges of the plurality of thoroughfare segments.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing a method of any of the claims.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings:

FIG. 1A is a diagram of a system capable of 2D edge-based map matching, according to one embodiment;

FIG. 3C is a flowchart of a process for comparing a probe data point to the edges of a plurality of thoroughfare segments, according to one embodiment;

DESCRIPTION OF SOME EMBODIMENTS

Figure 1B:
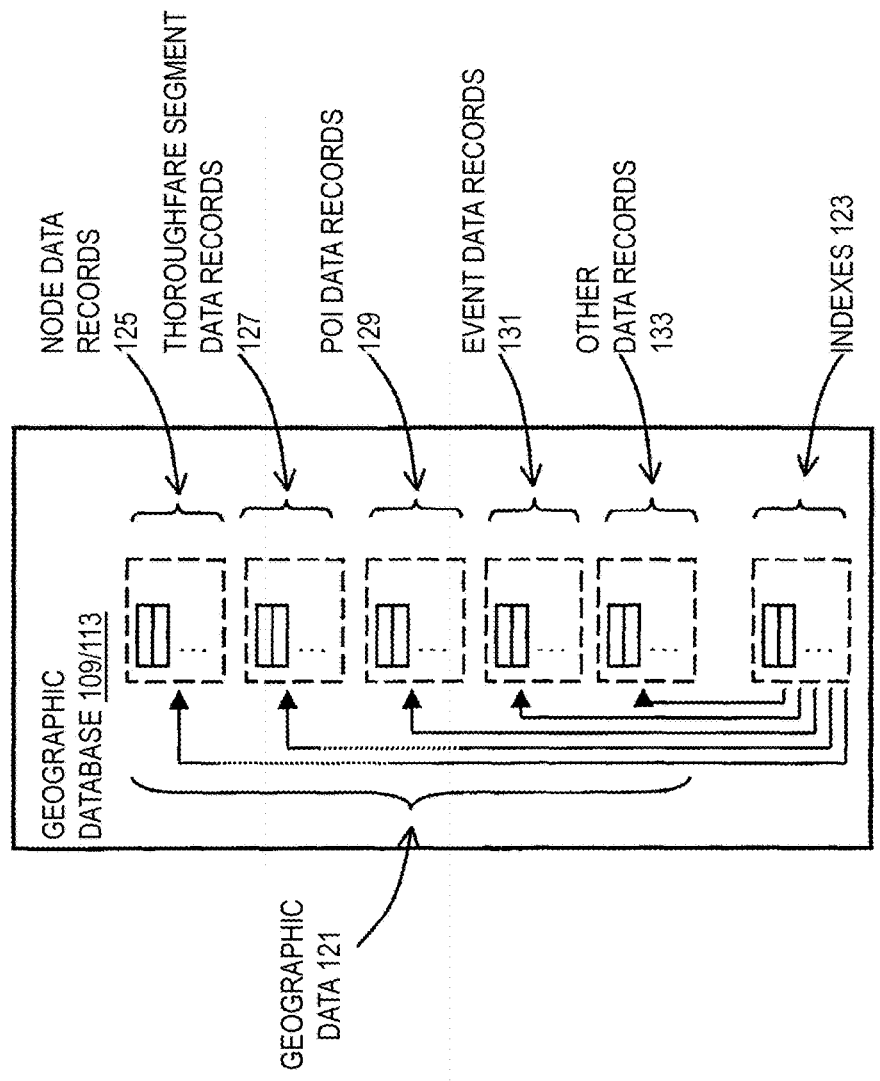
FIG. 1B is a diagram of a geographic database, such as can be included in the system of FIG. 1A, according to one embodiment.

Examples of a method, apparatus, and computer program for two dimensional, or edge-based, map matching are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

As used herein, the term two dimensional (2D) refers to the lateral physical extent of one or more thoroughfare segments with respect to their centerlines. A thoroughfare network is typically modeled based on a series of nodes and links interconnecting the nodes without indicating the physical extent of the thoroughfares themselves. In this sense, the thoroughfare network is one dimensional (1D). As used herein, the term edge refers to a boundary of a thoroughfare based on its physical extent. The physical extent may be an actual physical extent as determined by surveying the thoroughfare segment or an estimated physical extent based on various empirical rules governing thoroughfare width (e.g., in certain jurisdictions the speed limit is directly correlated to the size of the road). Thus, every thoroughfare possesses two edges corresponding to the two sides of the centerline. Although various embodiments are described with respect to a 2D edge-based map matching platform, it is contemplated that the approach described herein may be used with other decentralized or distributed components.

FIG. 1A is a diagram of a system 100 capable of 2D edge-based map matching, according to one embodiment. As shown in FIG. 1A, the system 100 comprises a user equipment (UE) 101 having connectivity to services platform 103 via communication network 105. In one embodiment, services platform 103 includes one or more services 107a-107n (also collectively referred to as services 107) (e.g., navigation services, media content services, etc.) that provide service functions and/or content using information or data stored in one or more databases. In the case of location-based services, the one or more databases may include geographic database 109. In one embodiment, geographic database 109 is maintained by one or more content providers 111a-111k (also collectively referred to as content providers 111). A content provider (e.g., content provider 111a) can be a map content provider that provides mapping and location information in the form of geographic database 109. By way of example, content providers 111 may maintain and keep up-to-date geographic database 109.

By way of example, the communication network 105 of system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), wireless LAN (WLAN), Bluetooth®, Internet Protocol (IP) data casting, satellite, mobile ad-hoc network (MANET), and the like, or any combination thereof.

The UE 101 is any type of mobile terminal, fixed terminal, or portable terminal including a mobile handset, station, unit, device, multimedia computer, multimedia tablet, Internet node, communicator, desktop computer, laptop computer, notebook computer, netbook computer, tablet computer, personal communication system (PCS) device, personal navigation device, personal digital assistants (PDAs), audio/video player, digital camera/camcorder, positioning device, television receiver, radio broadcast receiver, electronic book device, game device, or any combination thereof, including the accessories and peripherals of these devices, or any combination thereof. It is also contemplated that the UE 101 can support any type of interface to the user (such as "wearable" circuitry, etc.).

In one embodiment, the end user device or UE 101 can be an in-vehicle navigation system, a personal navigation device (PND), a portable navigation device, a cellular telephone, a mobile phone, a personal digital assistant (PDA), a watch, a camera, a computer, and/or other device that can perform navigation-related functions, such as digital routing and map display. In one embodiment, the navigation device embodied in a UE 101 can be a cellular telephone. An end user can use the UE 101 for navigation functions such as guidance and map display, for example, and for determination of one or more personalized routes or route segments based on one or more calculated and recorded routes, according to exemplary embodiments.

In one embodiment, UE 101 is a client of at least one of the services 107 (e.g., a location-based service such as a mapping or navigation service) that depends on the information from the geographic database 109. Accordingly, UE 101 includes a version of all or a portion of geographic database 109 that is stored locally at UE 101 as geographic database 113. By way of example, UE 101 can execute one or more applications 115a-115j (e.g., client applications of the services 107) to access and/or execute one or more functions associated with the locally stored geographic database 113.

In one embodiment, UE 101 may include navigation module 117 that determines the temporal and spatial position of UE 101 with respect to a thoroughfare network. As used herein, thoroughfare refers to any road, street, or path over which traffic (either vehicular or non-vehicular) can be routed. Navigation module 117 may include various sensors (not shown for illustrative convenience) for detecting the velocity (e.g., odometer) and bearing (e.g., gyrometer) of UE 101. The spatial position of UE 101 may be determined by various positioning systems, including global positioning system (GPS), global navigation satellite system (GLONASS), among others. Thus, navigation module 117 may include a GPS or GLONASS receiver to obtain positioning information from global navigation satellite system 119. It is contemplated that other, non-satellite positioning technologies may also be utilized by navigation module 117 to determine the location of UE 101. For example, navigation module 117 may utilize a cellular network (not shown) to obtain positioning information (e.g., based on triangulation techniques such as multilateration).

Based on the temporal and spatial information obtained from its sensors, navigation module 117 may perform a map matching function. In one embodiment, the map matching function includes determining if the positioning information accurately and reliably indicates that UE 101 lies on a segment of a thoroughfare network. The map matching function takes into account the spatial positioning data obtained from the sensors of navigation module 117 and thoroughfare mapping information obtained from geographic database 109 or 113 to make this determination. In certain embodiments, the map matching function may also take into consideration the velocity and/or bearing information to determine whether to discard unreliable positioning data. For example, probe data that is below a minimum threshold velocity may be discarded because positional accuracy for such data is known to be worse at low speeds. Also, probe data that does not closely track the heading of the thoroughfare network may also be discarded because such data may cause incorrect matching to nearby intersecting thoroughfares.

FIG. 1B is a diagram of geographic databases 109/113 of system 100, according to exemplary embodiments. In the exemplary embodiments, mapping data can be stored, associated with, and/or linked to the geographic databases 109/113. In one embodiment, the geographic databases 109/113 include geographic data 121 used for (or configured to be compiled to be used for) mapping and/or navigation-related services, such as for personalized route determination, according to exemplary embodiments. In one embodiment, the geographic databases 109/113 may include one or more indexes 123 for indexing the geographic data 121. By way of example, the geographic databases 109/113 include node data records 125, thoroughfare segment or link data records 127, POI data records 129, event data records 131, and other data records 133. More, fewer or different data records can be provided. In one embodiment, the other data records 133 include cartographic ("carto") data records, routing data, and maneuver data. One or more portions, components, areas, layers, features, text, and/or symbols of the POI or event data can be stored in, linked to, and/or associated with one or more of these data records. For example, one or more portions of the POI, event data, or recorded route information can be matched with respective map or geographic records via position or GPS data associations (such as using known or future map matching or geo-coding techniques), for example.

In exemplary embodiments, the thoroughfare segment data records 127 are links or segments representing roads, streets, or paths, as can be used in the calculated route or recorded route information for determination of one or more personalized routes, according to exemplary embodiments. The node data records 125 are end points corresponding to the respective links or segments of the thoroughfare segment data records 127. The thoroughfare segment data records 127 and the node data records 125 represent a thoroughfare network, such as used by vehicles and/or other entities (e.g., pedestrians, trains, planes, boats, etc.). Alternatively, the geographic database 109/113 can contain path segment and node data records or other data that represent pedestrian paths or areas in addition to or instead of the vehicle road record data, for example.

The thoroughfare/link segments and nodes can be associated with attributes, such as geographic coordinates, street names, address ranges, speed limits, turn restrictions at intersections, and other navigation related attributes, as well as POIs, such as gasoline stations, hotels, restaurants, museums, stadiums, offices, automobile dealerships, auto repair shops, buildings, stores, parks, etc. The geographic databases 109/113 can include data about the POIs and their respective locations in the POI data records 129. The geographic databases 109/113 can also include data about places, such as cities, towns, or other communities, and other geographic features, such as bodies of water, mountain ranges, etc. Such place or feature data can be part of the POI data records 129 or can be associated with POIs or POI data records 129 (such as a data point used for displaying or representing a position of a city). In addition, the geographic databases 109/113 can include event data (e.g., traffic incidents, construction locations, scheduled events, unscheduled events, etc.) associated with the POI data records 129 or other records of the geographic database 109/113.

The geographic databases 109/113 can be maintained by the content provider 111 in association with the services platform 103 and/or content provider 111 (e.g., a map developer). The map developer can collect geographic data to generate and enhance the geographic databases 109/113. There can be different ways used by the map developer to collect data. These ways can include obtaining data from other sources, such as municipalities or respective geographic authorities. In addition, the map developer can employ field personnel to travel by vehicle along roads throughout the geographic region to observe features and/or record information about them, for example. Also, remote sensing, such as aerial or satellite photography, can be used.

The geographic databases 109/113 can be a master geographic database stored in a format that facilitates updating, maintenance, and development. For example, the master geographic databases 109/113 or data in the master geographic databases 109/113 can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data is compiled (such as into a platform specification format (PSF) format) to organize and/or configure the data for performing navigation-related functions and/or services, such as route calculation, route guidance, map display, speed calculation, distance and travel time functions, and other functions, by a navigation device, such as by a UE 101, for example. The navigation-related functions can correspond to vehicle navigation, pedestrian navigation, or other types of navigation. The compilation to produce the end user databases can be performed by a party or entity separate from the map developer. For example, a customer of the map developer, such as a navigation device developer or other end user device developer, can perform compilation on a received geographic database in a delivery format to produce one or more compiled navigation databases.

As mentioned above, the geographic database 109 can be a master geographic database, but in alternate embodiments, the client side geographic database 113 can represent a compiled navigation database that can be used in or with end user devices (e.g., UEs 101) to provide navigation-related functions. For example, the geographic database 113 can be used with the UE 101 to provide an end user with navigation features. In such a case, the geographic database 113 can be downloaded or stored on the end user device UE 101, such as in applications 115, or the end user device UE 101 can access the geographic database 109 and/or 113 through a wireless or wired connection (such as via a server and/or the communication network 105), for example.

Figure 1C:
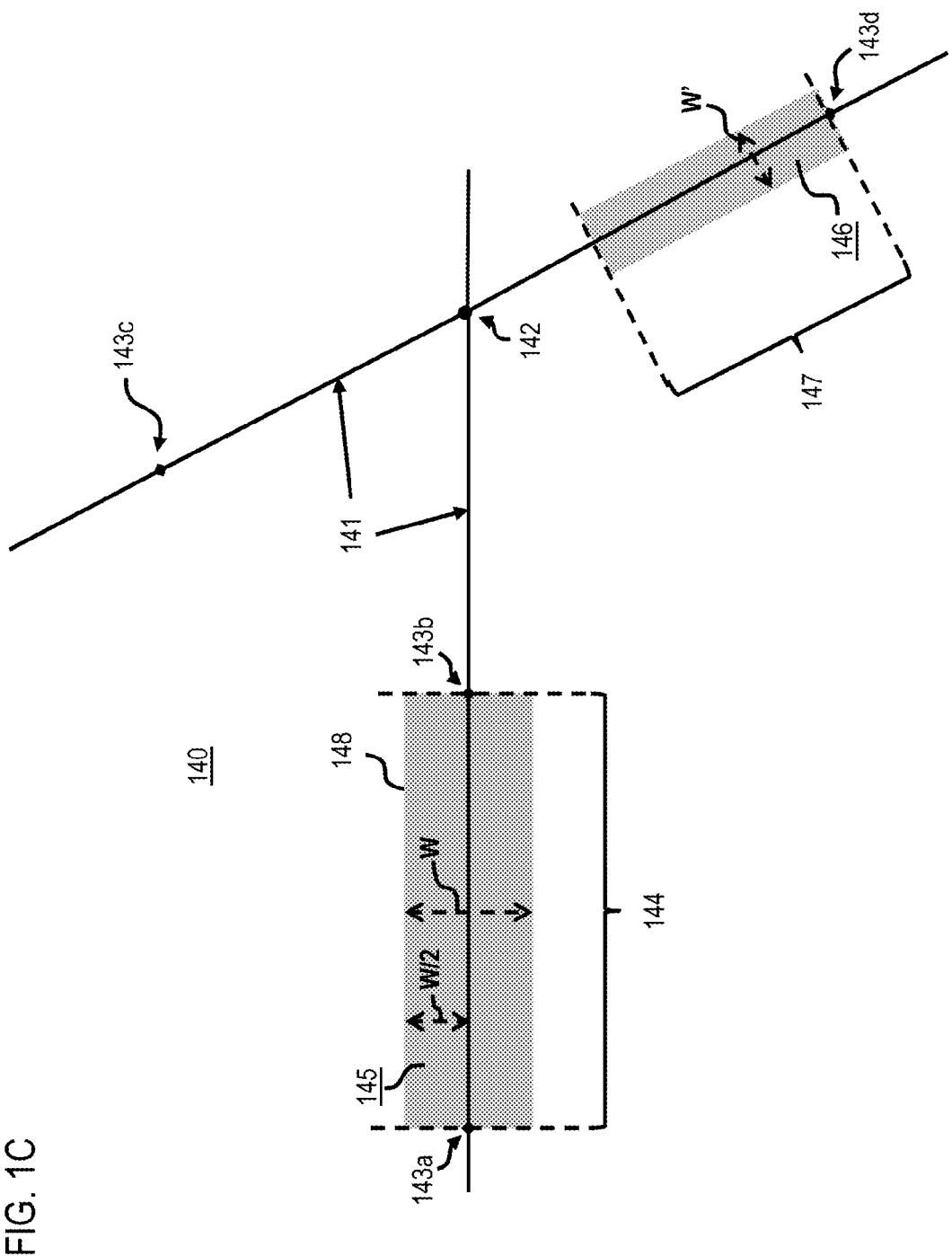
FIG. 1C is a diagram of a thoroughfare network representation, according to one embodiment.

FIG. 1C is a diagram of a thoroughfare network representation, according to one embodiment. As shown in FIG. 1C, a thoroughfare network 140 may be modeled in terms of a network of nodes interconnected by centerlines (e.g., centerlines 141). Nodes may include intersection nodes (e.g., intersection node 142) and thoroughfare segment nodes (e.g., thoroughfare segment nodes 143a-143d). Intersection nodes (e.g., intersection node 142) indicate points of intersection in the thoroughfare network. Thoroughfare segment nodes (e.g., thoroughfare segment nodes 143a-143d) are geographic markers along thoroughfare segments. In one embodiment, a pair of thoroughfare segment nodes demarcates the boundaries of a thoroughfare segment. For example, thoroughfare segment 144 may be defined with reference to thoroughfare segment nodes 143a and 143b. When used in connection with a particular thoroughfare segment, the term centerline may be used to refer more specifically to the straight line interpolating a pair of segment nodes. Thus, for example, the straight line interconnecting thoroughfare segment nodes 143a and 143b may be referred to as the centerline of thoroughfare segment 144.

Thoroughfare network 140 may be specified purely in terms of nodes and centerlines without specifying the physical extents (e.g., physical extent 145 and 146) of the thoroughfare segments. As used herein, physical extent refers to an actual or estimated extent of a thoroughfare segment extending laterally from centerlines 141. Physical extent information may be known by LIDAR (Light Detection and Ranging) sensors or from surveying information. In one embodiment, the physical extent information for a thoroughfare segment is stored in association with thoroughfare segment data records 127 in geographic databases 109/113. The physical extent may also be estimated based on a thoroughfare speed limit (e.g., in the case of vehicular thoroughfares, 10 meters for low speed roads, 20 meters for arteries, and 30 meters for highways). Or, the physical extent may be estimated based on lane counts (e.g., in the case of vehicular thoroughfares, 3 meters per lane in the United States and 2.5 meters per lane in Europe). Physical extent information may be used to obtain a width measurement of a thoroughfare segment. For example, physical extents 145 and 146 may be used to determine the respective widths W and W' of thoroughfare segments 144 and 147. In one embodiment, the distance from centerline 141 to an edge 148 of physical extent 145 may be calculated as half the width W (W/2).

Figure 1D:
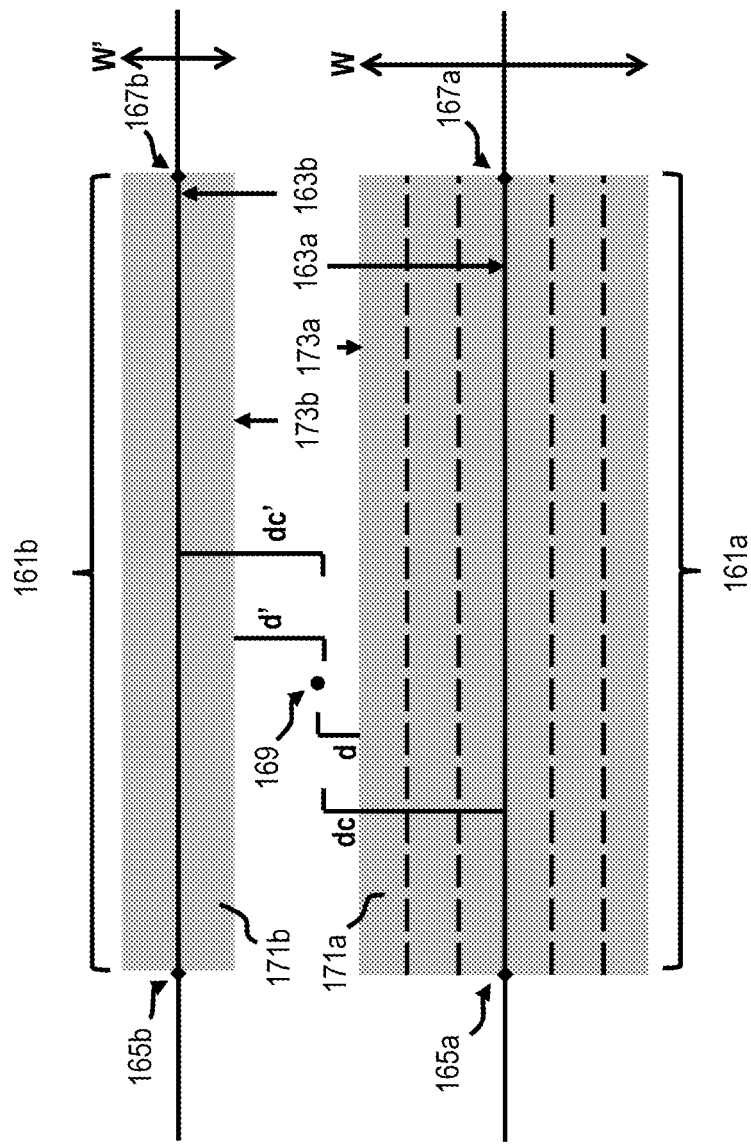
FIG. 1D is a diagram illustrating map matching for a probe data point located between the respective physical extents of two adjacent thoroughfare segments, according to a conventional method.

FIG. 1D is a diagram illustrating map matching for a probe data point located between the respective physical extents of two adjacent thoroughfare segments, according to a conventional method. FIG. 1D illustrates a map view of two adjacent thoroughfare segments 161a and 161b running alongside each other in a roughly parallel formation. Centerlines 163a and 163b are straight lines interconnecting the respective thoroughfare segment nodes 165a-167a and 165b-167b. As shown, probe data point 169 lies in between the two thoroughfare segments such that it does not fall within the physical extents 171a and 171b associated with either of the thoroughfare segments 161a and 161b. As mentioned, this positioning error may be due to various environmental and system errors, including communication delays, signaling errors (e.g., multipath effects), as well as measurement errors introduced by components of the positioning system (e.g., atomic clocks aboard satellite positioning systems). Probe data point 169 is specifically at a perpendicular (or shortest) distance of dc and dc' from respective centerlines 163a and 163b, where dc'<dc. Also, probe data point 169 is at a perpendicular (or shortest) distance of d and d' from respective edges 173a and 173b, where d'>d. That is, probe data point 169 is closer to the edge 173a of thoroughfare segment 161a than that of thoroughfare segment 161b, suggesting that it should correctly be matched to thoroughfare segment 161a. The edges 173a and 173b may correspond to an actual physical extent of the respective thoroughfare segments 161a and 161b (e.g., based on a survey of the thoroughfare segments) or an estimated physical extent based on various empirical rules (e.g., rules governing lane width). In the absence of actual physical extent information, a map matching system may fall back on estimates based on the empirical rules.

Centerline-based map matching techniques do not take into consideration the physical extent (actual or estimated) of the thoroughfare network. Instead, they rely solely on measurements with respect to the centerlines of the thoroughfare network to determine whether a probe data point lies on a particular thoroughfare segment. That is, these techniques match the probe data point to the thoroughfare segment with the closet centerline. Such an approach is at least problematic when the probe data point lies between the centerlines of two thoroughfare segments of uneven extents (e.g., widths) (as in FIG. 1D). Assuming that the object represented by probe data point 169 is actually traveling on thoroughfare segment 161a, a centerline-based map matching technique will compare the distance from probe data point 169 to each of the centerlines 163a and 163b of thoroughfare segments 161a and 161b (e.g., dc and dc') and will incorrectly reposition the probe data point to thoroughfare segment 161b because probe data point 169 is closer to the centerline 163b of thoroughfare segment 161b than the centerline 163a of thoroughfare segment 161a (e.g., because dc'<dc).

Figure 1E:
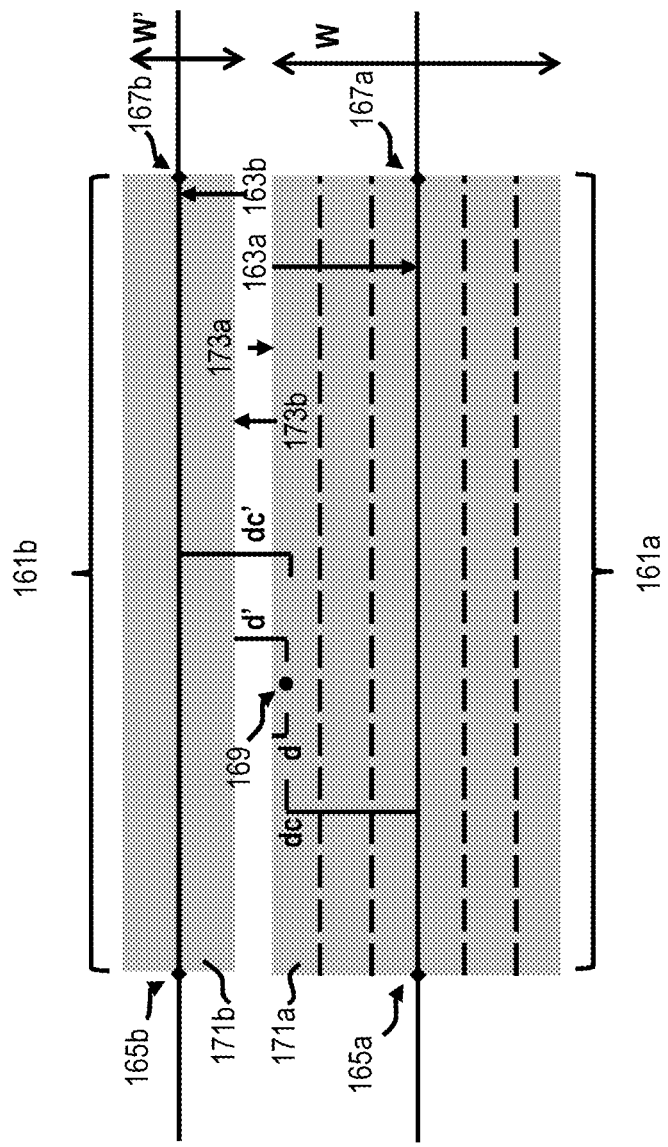
FIG. 1E is a diagram illustrating map matching for a probe data point located within the physical extent of one of two adjacent thoroughfare segments, according to a conventional method.

FIG. 1E is a diagram illustrating map matching for a probe data point located within the physical extent of one of two adjacent thoroughfare segments, according to a conventional method. Assuming that the object represented by probe data point 169 is actually traveling on thoroughfare segment 161a, FIG. 1E further illustrates how centerline-based proximity map matching techniques will incorrectly match probe data point 169 to thoroughfare segment 161b even when probe data point 169 lies within the physical extent 171a of the wider thoroughfare segment 161a. As shown, probe data point 169 lies within the physical extent 171a of the multi-lane thoroughfare segment 161a. However, the presence of the narrower dual-lane thoroughfare segment 161b in close proximity to the multi-lane thoroughfare segment 161a will cause a centerline-based proximity map matching technique to incorrectly reposition the probe data point 169 to the dual-lane thoroughfare segment 161b instead of the multi-lane segment 161a because dc'<dc.

To address this problem, a system 100 of FIG. 1A introduces the capability to perform 2D edge-based map matching that takes into consideration an estimated width of the thoroughfare segments via 2D edge-based map matching platform 175 and probe data database 177. In one embodiment, the system 100 provides the capability to accurately disambiguate map matching for probe data points located between the centerlines of thoroughfare segments of uneven width by taking into account the distance from the probe data points to the edges of the thoroughfare segments.

In one embodiment, 2D edge-based map matching platform 175 receives a request to match a probe data point to one of a plurality of thoroughfare segments, determines respective edges of the plurality of thoroughfare segments, and causes a matching of the probe data point to the one thoroughfare segment based on a comparison of the probe data point to the respective edges of the plurality of thoroughfare segments. For example, 2D edge-based map matching platform 175 may compare the perpendicular distance of the probe data point to the edges of the thoroughfare segments to determine which edge is closest and match the probe data point to the corresponding thoroughfare segment. By taking the physical extents of the thoroughfare segments into account, 2D edge-based map matching platform disambiguates the repositioning of the inaccurate probe data.

In one embodiment, 2D edge-based map matching platform 175 may further determine the plurality of thoroughfare segments based on the plurality of thoroughfare segments being proximate to the probe data point among a network of thoroughfare segments, wherein the plurality of thoroughfare segments are substantially parallel. In another embodiment, the probe data point lies between centerlines of the plurality of thoroughfare segments. 2D edge-based map matching platform 175 may disregard those thoroughfare segments that are too far away to be possible candidates for repositioning the probe data point or are separated from probe data point by other thoroughfare segments. It is contemplated that 2D edge-based map matching platform 175 may rely on mapping data and/or other data for the thoroughfare network in order to focus only on those thoroughfare segments that are the most likely candidates for map matching.

In one embodiment, 2D edge-based map matching platform 175 determines first distances from the probe data point to centerlines of the plurality of thoroughfare segments, determines second distances from the centerlines to the respective edges of the plurality of thoroughfare segments, and the comparison is based on subtracting the second distances from the first distances. By way of example and with reference to FIG. 1D, the 2D edge-based map matching platform 175 may subtract the second distances from the first distances to determine the distance of the probe data point 169 to the respective edges 173a and 173b. In another embodiment, the probe data point is matched to the one thoroughfare segment based on a smallest distance. Thus, for example, the 2D edge-based map matching platform 175 may determine that the probe data point 169 is closer to the edge 173a of thoroughfare segment 161a than to the edge 173b of thoroughfare segment 161b. In one embodiment, 2D edge-based map matching platform 175 may determine respective edges of the plurality of thoroughfare segments based on a respective numbers of lanes of the plurality of thoroughfare segments multiplied by a lane width. The edges may be determined based on the estimated physical extent of the respective thoroughfare segments. For example, thoroughfare segment 161a is a six-lane highway and thoroughfare segment 161b is a dual-lane road. The edges 173a and 173b respectively of thoroughfare segments 161a and 161b may be determined by multiplying their lane counts with a lane width.

In one embodiment, 2D edge-based map matching platform 175 determines elevation information associated with the plurality of thoroughfare segments, the probe data point, or a combination thereof, and the matching of the probe data point to the one thoroughfare segment is based on the elevation information. By way of example, the platform 175 may match the probe data point 169 based, at least in part, on determining which of thoroughfare segments 161a and 161b is closer in elevation.

In one embodiment, 2D edge-based map matching platform 175 determines the elevation information of one or more of the plurality of thoroughfare segments based on an average elevation of one or more other probe data points associated with the plurality of thoroughfare segments. For example, if elevation information for the thoroughfare segments is unavailable, 2D edge-based map matching platform 175 may analyze the elevation of other probe data points to infer the respective elevations.

In one embodiment, the respective edges of the plurality of thoroughfare segments are respective edges of each of the plurality of thoroughfare segments proximate to the probe data point. For example and with reference to FIG. 1D, each of the thoroughfare segments 161a and 161b have two edges. 2D edge-based map matching platform may compare the probe data point 169 only to the edges 173a and 173b.

By way of example, the UE 101 services platform 103, services 107, content providers 111, applications 115, and 2D edge-based map matching platform 175 communicate with each other and other components of the communication network 105 using well known, new or still developing protocols. In this context, a protocol includes a set of rules defining how the network nodes within the communication network 105 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

In one embodiment, the applications 115 and the services 107 can interact according to a client-server model, for example. It is noted that the client-server model of computer process interaction is widely known and used. According to the client-server model, a client process sends a message including a request to a server process, and the server process responds by providing a service. The server process can also return a message with a response to the client process. Often the client process and server process execute on different computer devices, called hosts, and communicate via a network using one or more protocols for network communications. The term "server" is conventionally used to refer to the process that provides the service, or the host computer on which the process operates. Similarly, the term "client" is conventionally used to refer to the process that makes the request, or the host computer on which the process operates. As used herein, the terms "client" and "server" refer to the processes, rather than the host computers, unless otherwise clear from the context. In addition, the process performed by a server can be broken up to run as multiple processes on multiple hosts (sometimes called tiers) for reasons that include reliability, scalability, and redundancy, among others.

Figure 2:
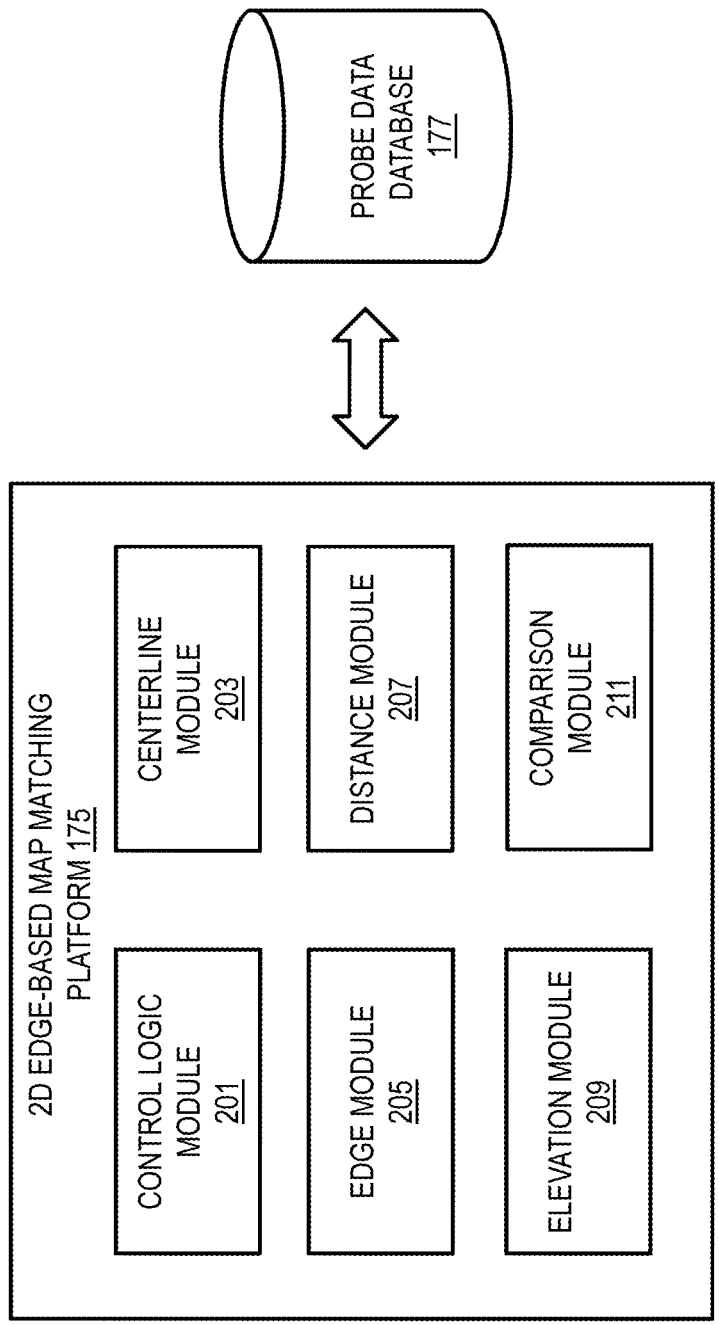
FIG. 2 is a diagram of the components of a 2D edge-based map matching platform, according to one embodiment.

FIG. 2 is a diagram of the components of 2D edge-based map matching platform 175, according to one embodiment. By way of example, the 2D edge-based map matching platform 175 includes one or more components for providing 2D edge-based map matching. It is contemplated that the functions of these components may be combined in one or more components or performed by other components of equivalent functionality. In this embodiment, 2D edge-based map matching platform 175 includes a control logic module 201, a centerline module 203, an edge module 205, a distance module 207, an elevation module 209, and a comparison module 211. In one embodiment, as shown, 2D edge-based map matching platform 175 may be connected to, or include, a probe data database 177.

In one embodiment, control logic module 201 uses centerline module 203 to determine one or more centerlines of the plurality of thoroughfare segments for which map matching is to be performed. In one embodiment, centerline module 203 may query geographic database 109 to obtain thoroughfare segment data records 157 and node data records 155. A centerline for a particular thoroughfare segment may be determined as the line connecting the corresponding thoroughfare segment nodes. In another embodiment, centerline module 203 may determine a centerline for smaller sections of a thoroughfare segment than one demarcated by the segment nodes obtained from node data records 155. In this manner, 2D edge-based map matching can be performed with respect to arbitrary small subsections of thoroughfare segments. For thoroughfare segment nodes adjacent to an intersection node, the centerlines may be determined as the line connecting the thoroughfare node to the intersection node.

In one embodiment, control logic module 201 uses edge module 205 to determine the edges of a thoroughfare segment. Edge module 205 may determine the edges based on physical extent information queried from geographic databases 109/113. As mentioned, physical extent information may be available for a thoroughfare segment from the results of surveying. Edge module 205 may also estimate the physical extent based on a thoroughfare speed limit (e.g., in the case of vehicular thoroughfares, 10 meters for low speed roads, 20 meters for arteries, and 30 meters for highways). Or, the physical extent may be estimated based on lane counts (e.g., in the case of vehicular thoroughfares, 3 meters per lane in the United States and 2.5 meters per lane in Europe). In one embodiment, edge module 205 may use this physical extent information to determine the width of a thoroughfare segment. For example, edge module 205 may determine a width W of thoroughfare segment 144 and the displacement of the edge 148 from the centerline 141 may be calculated as half the width (W/2).

In one embodiment, control logic module 201 uses distance module 207 to determine the perpendicular (or shortest) distance of a probe data point to the edges of one or more thoroughfare segments. By way of example, for the configuration illustrated in FIG. 1D, distance module 207 may determine the perpendicular distance d and d' of probe data point 169 to edges 173a and 173b of thoroughfare segments 161a and 161b, respectively. In one embodiment, distance module 207 may determine the perpendicular distances d and d' based on the respective perpendicular distances dc and dc' (from the probe data point 169 to the respective centerlines 163a and 163b) and the widths W and W' of the thoroughfare segments. For example, the distance may be calculated as the difference of the distance to the centerline (e.g., dc) and the distance from the centerline to the edge (e.g., W/2), i.e., d=dc−(W/2).

In one embodiment, control logic module 201 uses elevation module 209 to determine the elevation of a probe data point above (or below) one or more thoroughfare segments. Elevation module 209 may determine the elevation in order to further match the probe data point to a thoroughfare segment based on a comparison with the elevation of the thoroughfare segment. In cases where elevation information of the one or more thoroughfare segments is unavailable, elevation module 209 may indirectly determine the elevation based on a statistical analysis of elevation levels for other probe data points associated with the thoroughfare segments where such other probe data points include elevation information.

In one embodiment, control logic module 201 uses comparison module 211 to compare a probe data point with respect to one or more thoroughfare segments to match the probe data point to one thoroughfare segment among the one or more thoroughfare segments. Comparison module 211 may compare the probe data point based on its distance from the edges of one or more thoroughfare segments to determine the thoroughfare segment that is located at the smallest perpendicular distance with respect to the edge. Comparison module 211 may also compare the probe data point to the thoroughfare segments based on their respective elevations. The results of this comparison may determine a thoroughfare segment that is closest to the probe data point in altitude.

Figure 3A:
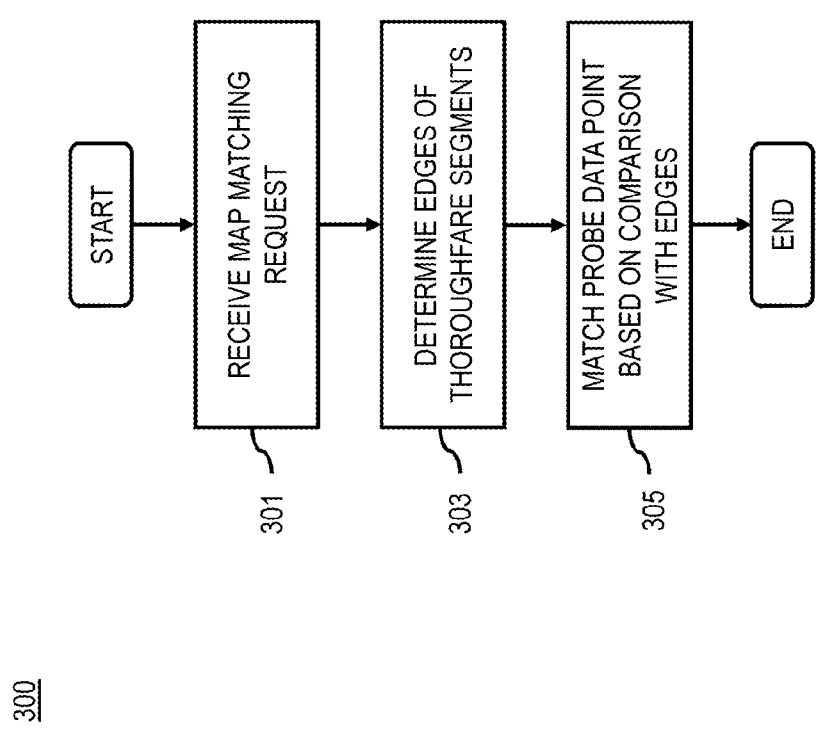
FIG. 3A is a flowchart of a process for 2D edge-based map matching, according to one embodiment.
Figure 7:
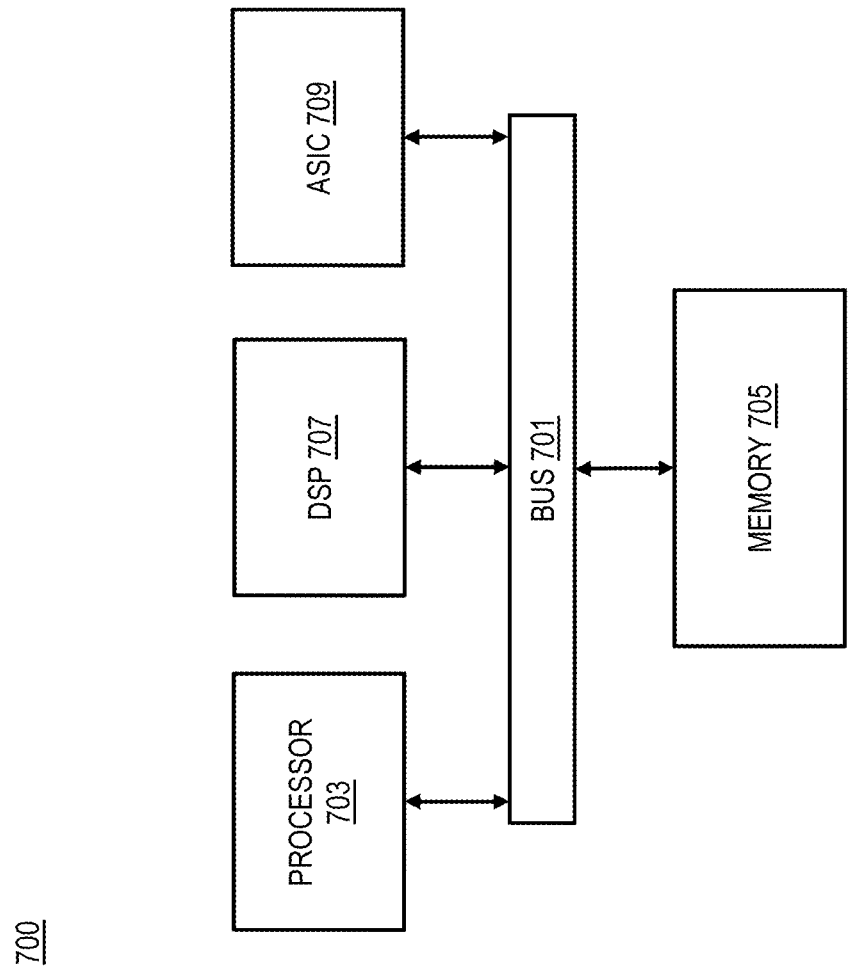
FIG. 7 is a diagram of a chip set that can be used to implement an embodiment of the invention.

FIG. 3A is a flowchart of a process 300 for 2D edge-based map matching, according to one embodiment. In one embodiment, the 2D edge-based map matching platform 175 performs the process 300 and is implemented in, for instance, a chip set including a processor and a memory as shown in FIG. 7.

In step 301, a request is received to match a probe data point to one of a plurality of thoroughfare segments. In one embodiment, step 301 may involve 2D edge-based map matching platform 175 receiving the request from UE 101, such as from the navigation module 117 or one or more applications 115 associated with the UE 101, which may require map matching for various location-based services (e.g., navigation, route guidance, fleet management, traffic control and management, etc.). UE 101 may provide a probe data point including geographic coordinates as obtained from a positioning system (e.g., global navigation satellite system 119). In one embodiment, step 301 may involve 2D edge-based map matching platform 175 receiving the request from one or more services 107 that are providing navigation or map matching services for the UE 101.

In step 303, the respective edges of the plurality of thoroughfare segments are determined. As used herein, the term edge refers to a boundary of a thoroughfare based on its physical extent. The edges may be determined based on the actual physical extent of the thoroughfare segments (e.g., obtained by surveying) or various rule-based estimations for the width of the thoroughfare segments. For example, in the case of vehicular thoroughfare segments, the width (and, therefore, the edges) of the thoroughfare segments may be determined based on the number of lanes or the speed limit.

In one embodiment, 2D edge-based map matching platform 175 may determine the edges of all thoroughfare segments in the immediate surrounding area of the probe data point. By way of example and with reference to FIG. 1D, step 303 may involve determining the edges 173a and 173b of thoroughfare segments 161a and 161b that are adjacent to probe data point 169. It is contemplated that various algorithmic techniques may be employed by 2D edge-based map matching platform 175 to determine the thoroughfare segments adjacent to the probe data point. In one embodiment, these algorithms may obtain geographic mapping data from geographic databases 109/113 to determine a subset of thoroughfare segments that lie within a radius corresponding to an error margin, or some multiple thereof, for the positioning system.

In step 305, the probe data point is matched to one of the respective thoroughfare segments based on a comparison of the edges. In one embodiment, step 305 may involve matching the probe data point based on a comparison of the respective distances of the edges to the probe data point. By way of example and with reference to FIG. 1D, 2D edge-based map matching platform 175 may match probe data point 169 to thoroughfare segment 161a based on a comparison of the perpendicular (or shortest) distance from probe data point 169 to the edges 173a and 173b. Based on the above matching, one out of two or more thoroughfare segments that are in close proximity to a probe data point may be accurately matched to the probe data point despite potential errors associated with the probe data point and despite the probe data point being closer in proximity to a centerline associated with another one of the two or more thoroughfare segments.

Figure 3B:
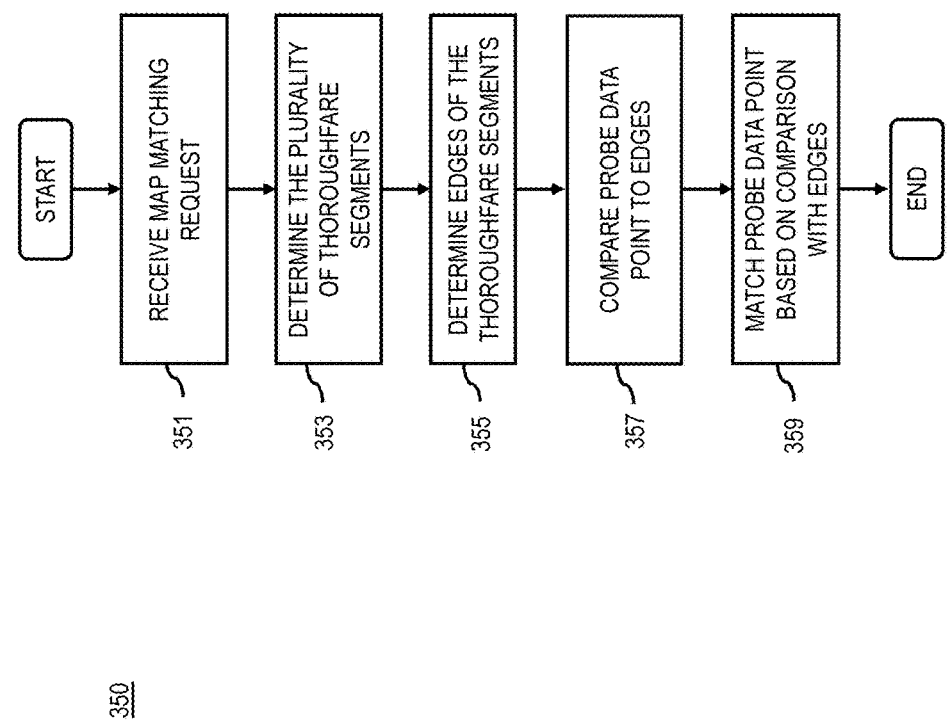
FIG. 3B is a flowchart of a more detailed process for 2D edge-based map matching, according to one embodiment.

FIG. 3B is a flowchart of a more detailed process 350 for 2D edge-based map matching, according to one embodiment. In one embodiment, the 2D edge-based map matching platform 175 performs the process 350 and is implemented in, for instance, a chip set including a processor and a memory as shown in FIG. 7.

In step 351, a request is received to match a probe data point to one of a plurality of thoroughfare segments. In one embodiment, step 301 may involve 2D edge-based map matching platform 175 receiving a probe data point from UE 101 as determined by global navigation satellite system 119. As mentioned earlier, these positioning systems may include various satellite-based systems (e.g., GPS and GLONASS) as well as other systems (e.g., cellular systems). In one embodiment, the request may also include mapping data for the plurality of thoroughfare segments. For example, UE 101 may supply the map data based on client side geographic database 113. Or, for example, 2D edge-based map matching platform 175 may obtain map data for the plurality of thoroughfare segments from geographic database 109.

In step 353, the plurality of thoroughfare segments is determined. Thoroughfare segments may be indicated as the links of the thoroughfare network. In one embodiment, step 353 may involve determining the thoroughfare segments based on the map data obtained from geographic databases 109/113. It is contemplated that the thoroughfare segments may correspond to any section of the thoroughfare network and are not limited to a fixed size. They may be taken at points of curvature in the thoroughfare network. In one embodiment, step 353 may involve 2D edge-based map matching platform 175 querying geographic database 113 to obtain node data records 125 and/or thoroughfare segment or link data records 127.

In one embodiment, step 353 may involve determining the plurality of thoroughfare segments based, at least in part, on the plurality of thoroughfare segments being proximate to the probe data point among a network of thoroughfare segments. For example, the probe data point may point to a location in an area or region of the map having a dense thoroughfare network (e.g., urban environments feature closely spaced or overlapping thoroughfare segments with frequent points of intersection). Such environments may include multiple thoroughfare segments lying within a relatively small radius of the probe data point. In one embodiment, step 353 may involve 2D edge-based map matching platform 175 determining the plurality of thoroughfare segments based on only those thoroughfare segments that are immediately adjacent to the probe data point.

In step 355, the respective edges of the plurality of thoroughfare segments are determined. A thoroughfare segment may have at least two edges corresponding to each side of the centerline for the thoroughfare segment. In one embodiment, step 355 may involve determining the edge that is on the side of the centerline adjacent to the probe data point. By way of example and with reference to FIG. 1D, step 355 may involve 2D edge-based map matching platform 175 determining the edges 173a and 173b of the respective thoroughfare segments 161a and 161b because these edges are adjacent to probe data point 169.

As mentioned earlier, the edge of a thoroughfare segment may be derived from physical extent information which may be based on observation (e.g., by surveying), sensors (e.g., LIDAR sensors), or by various estimation techniques (e.g., by multiplying the number of lanes by lane width). It is contemplated that an edge may also correspond to an artificially designated extent for more complex map matching of the probe data point to a particular lane in a multi-lane thoroughfare segment.

In step 357, the probe data point is compared to the respective edges of the plurality of thoroughfare segments. In one embodiment, step 357 may involve the distance module 207 determining a perpendicular (or shortest) distance from the probe data point to the respective edges of the plurality of thoroughfare segments. At points of curvature in the thoroughfare network, the perpendicular distance may be determined between the probe data point and a tangent to a thoroughfare segment. In one embodiment, step 357 may also involve the elevation module 209 determining the difference in elevation of the probe data point with respect to the elevation of the thoroughfare segments. That is, step 357, in addition to determining a horizontal distance to the edges of the thoroughfare segments, may also involve determining a vertical distance to the surfaces of the thoroughfare segments. As explained later, in one embodiment, 2D edge-based map matching platform 175 may also perform a map matching based on the altitude of the probe data point and the thoroughfare segments.

In step 359, the at least one probe data point is matched to a thoroughfare segment based on the comparison of the probe data point to the respective edges of the plurality of thoroughfare segments. In one embodiment, step 359 involves matching the probe data point to one of the thoroughfare segments for which the perpendicular distance is shortest. By way of example and with reference to FIG. 1D, 2D edge-based map matching platform 175 may match probe data point 169 to thoroughfare segment 161a because probe data point 169 is closest to edge 173a. In one embodiment, step 359 may also match probe data point 169 to thoroughfare segment 161a based on a comparison of the elevation of probe data point 169 to the elevation of thoroughfare segment if such elevation information is available. Based on the process 350, the probe data point can be accurately matched to the thoroughfare segment that an object represented by the probe data point is currently on.

FIG. 3C is a flowchart of a process 370 for comparing the probe data point to the respective edges of the plurality of thoroughfare segments, according to one embodiment. In one embodiment, the distance module 207 performs the process 370 and is implemented in, for instance, a chip set including a processor and a memory as shown in FIG. 7.

In step 371, first distances from the at least one probe data point to centerlines of the plurality of thoroughfare segments are determined. As mentioned, a thoroughfare network may be modeled in terms of a network of nodes and interconnecting centerlines. In one embodiment, step 371 may involve distance module 207 determining the perpendicular (or shortest) distance from the probe data point to the centerlines of the plurality of thoroughfare segments. For example, step 371 may involve obtaining the geographic location of the probe data point and the centerlines of the plurality of thoroughfare segments and then calculating the perpendicular distance. By way of example and with reference to FIG. 1D, distance module 207 may determine the distances dc and dc' of probe data point 169 to respective centerlines 163a and 163b.

In step 373, second distances from the centerlines to the respective edges of the plurality of thoroughfare segments are determined. In one embodiment, step 373 may involve distance module 207 determining the distance based on physical extent information obtained from geographic databases 109/113. As mentioned earlier, the physical extent of the plurality of thoroughfare segments may be determined based on actual observation or by various rule-based estimates of thoroughfare width. If the mapping data is based on actual observation, the second distance may be determined based on the actual map data indicating the location of the probe data point and the edges. If physical extent information is not directly available, an estimate of the thoroughfare width may be made based on the number of lanes and the width of each lane. In this case, the second distance may be determined as half the thoroughfare width. By way of example and with reference to FIG. 1D, distance module 207 may determine the distances W/2 and W'/2 from the respective edges 173a and 173b to the respective centerlines 163a and 163b.

In step 375, the second distances are subtracted from the first distances. By way of example and with reference to FIG. 1D, step 375 may be represented by Equation 1 as:

$$d = dc - (w/2) \quad (1)$$

where d is the distance of the probe data point to the edge of a thoroughfare segment, dc is the distance from the probe data point to the centerline of the thoroughfare segment, and w is the width of the thoroughfare segment. Based on the distance d, a comparison can be made between two or more thoroughfare segments to match a probe data point to a thoroughfare segment.

Figure 4A:
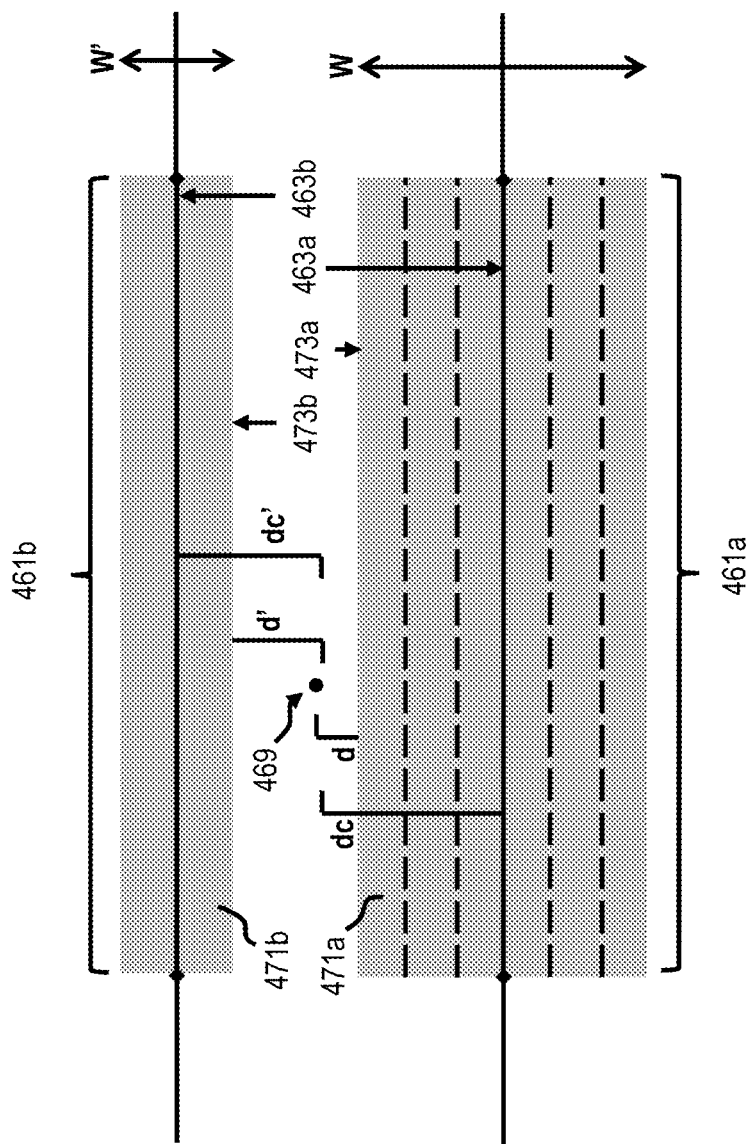
FIG. 4A is a diagram illustrating 2D edge-based map matching for a probe data point located between the respective physical extents of two adjacent thoroughfare segments, according to one embodiment.
Figure 4B:
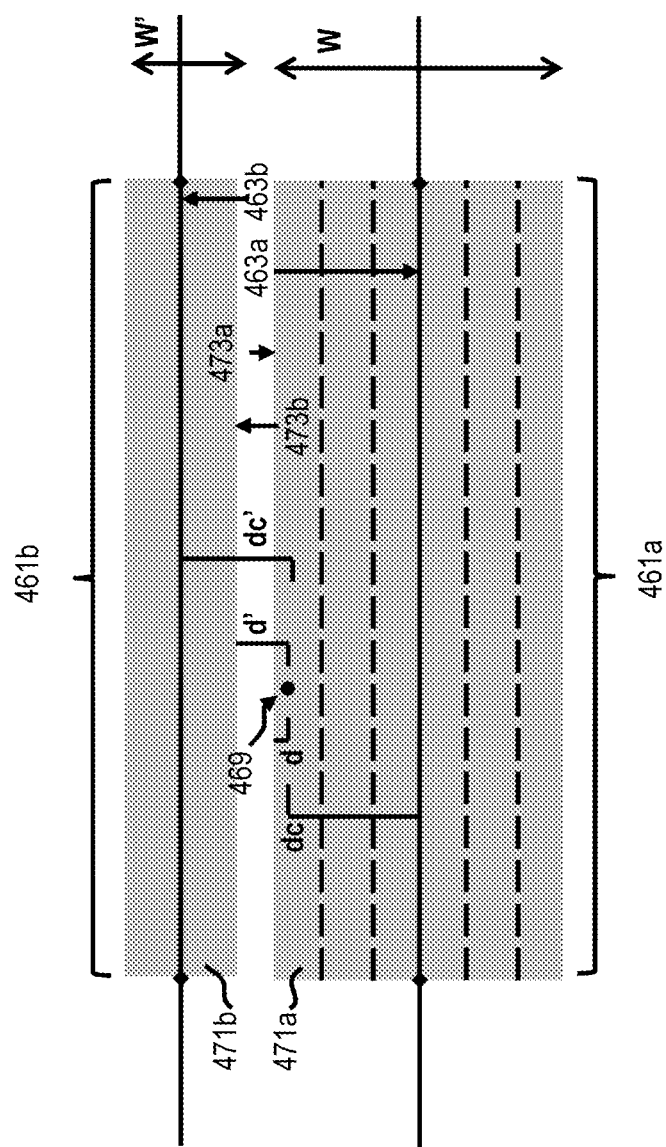
FIG. 4B is a diagram illustrating 2D edge-based map matching for a probe data point located within the physical extent of one of two adjacent thoroughfare segments, according to one embodiment.
Figure 4C:
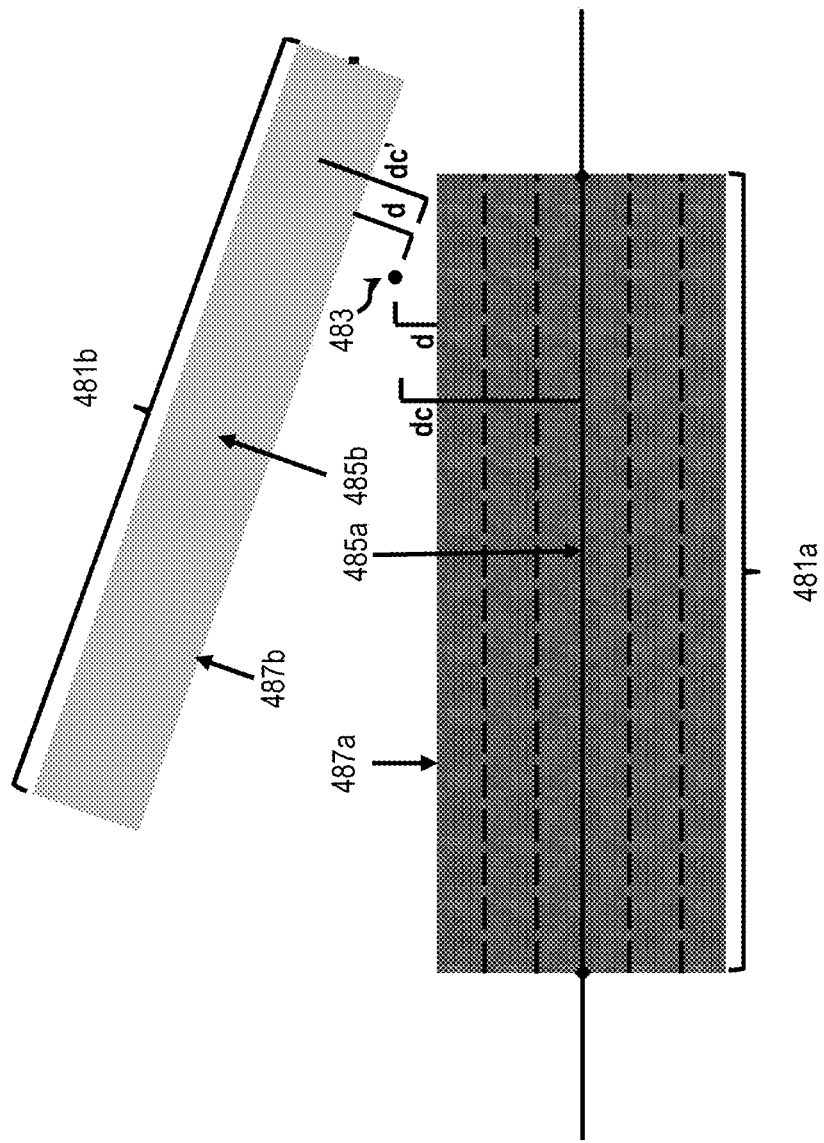
FIG. 4C is a diagram illustrating 2D edge-based map matching for a probe data point located between the respective physical extents of two non-parallel thoroughfare segments, according to one embodiment.

FIGS. 4A-4C are diagrams illustrating 2D edge-based map matching for a probe data point located between the respective physical extents of two adjacent thoroughfare segments, according to an embodiment.

FIG. 4A illustrates a map view of two adjacent thoroughfare segments 461a and 461b running alongside each in a roughly parallel formation and with centerlines 463a and 463b. As shown, probe data point 469 lies in between the two thoroughfare segments 461a and 461b such that probe data point 469 does not fall within the physical extents 471a and 471b of either thoroughfare segment. Probe data point 469 is specifically at a perpendicular distance of dc and dc' from respective centerlines 463a and 463b, where dc'<dc. Probe data point 469 is also at a perpendicular distance of d and d' from respective edges 473a and 473b, where d'>d. The distance d may be determined as the difference of dc and half the width of thoroughfare segment 461a (W/2) according to Equation 1 above. Similarly, the distance d' may be determined as the difference dc' and half the width of thoroughfare segment 461b (W'/2) according to Equation 1 above. In one embodiment, 2D edge-based map matching platform 175 may compare d and d' and correctly match probe data point 469 to thoroughfare segment 461a because d<d'.

FIG. 4B illustrates a similar map view of two adjacent thoroughfare segments 461a and 461b running alongside each in a roughly parallel formation and with centerlines 463a and 463b. As shown, probe data point 469 lies within the physical extent 471a of the thoroughfare segment 461a. As in FIG. 4A, probe data point 469 in FIG. 4B is at a perpendicular distance of dc and dc' from respective centerlines 463a and 463b, where dc>dc'. Thus, using conventional map matching techniques based on the centerlines of thoroughfare segments, probe data point 469 would be matched to thoroughfare segment 461b despite the probe data point 469 being within the physical extent 471a of thoroughfare segment 471a. However, 2D edge-based map matching platform 175 may compare d and d' and correctly reposition probe data point 469 to thoroughfare segment 461a because d<d'.

FIG. 4C is a diagram illustrating 2D edge-based map matching for a probe data point located between the respective physical extents of two non-parallel thoroughfare segments 481a and 481b, according to one embodiment. Probe data point 483 lies between the two thoroughfare segments 481a and 481b such that it does not fall within the physical extent of either segment. Probe data point 483 is located at a distance of dc and dc' from respective centerlines 483a and 483b, where dc'<dc, and is located at a distance of d and d' from respective edges 487a and 487b where d<d'. As shown, the perpendicular (or shortest) distance from probe data point 483 to the respective centerlines and edges are not parallel because of the orientation of the thoroughfare segments. In one embodiment, 2D edge-based map matching platform 175 again compares the distance d with d' and correctly repositions probe data point 483 to thoroughfare segment 481a.

Figure 5:
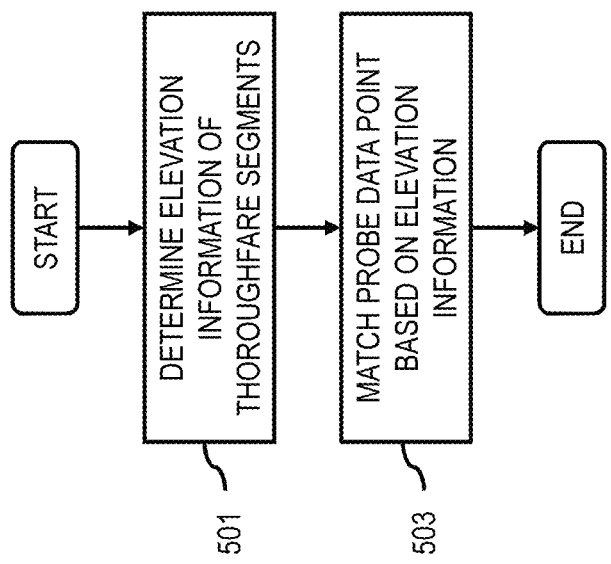
FIG. 5 is a flowchart of a process for matching a probe data point to a thoroughfare segment based on the elevation information, according to one embodiment.

FIG. 5 is a flowchart of a process 500 for matching the probe data point to a thoroughfare segment based on the elevation information, according to one embodiment. In one embodiment, the elevation module 209 performs the process 500 and is implemented in, for instance, a chip set including a processor and a memory as shown in FIG. 7.

In step 501, elevation information associated with the plurality of thoroughfare segments, the probe data point, or a combination thereof, is determined. In one embodiment, the thoroughfare segments for which the elevation information is determined have been selected according to step 353 of process 350. Elevation information may include a geographic mapping data indicating the altitude of the thoroughfare segments and the probe data point. In one embodiment, step 501 may involve elevation module 209 querying geographic databases 113 to obtain the geographic altitude of the thoroughfare segments. Step 501 may further involve elevation module 209 obtaining the elevation information associated with the probe data point based on the positioning information obtained by navigation module 117 in UE 101.

In one embodiment, the elevation information of one or more of the plurality of thoroughfare segments may be based on an average elevation of one or more other probe data points associated with the plurality of thoroughfare segments. For example, the map data may not have elevation information for one or more of the plurality of thoroughfare segments. In that case, the elevation information may be indirectly obtained based on the elevation data of other probe data points. In general, probe data points associated with a thoroughfare segment have roughly the same elevation and can be used to infer the elevation level of that thoroughfare segment. Thus, in one embodiment, elevation module 209 may determine the elevation information of the plurality of thoroughfare segments by querying probe data database 177 and analyzing the probe data to discover evidence of any statistical clustering around one or more average elevation values. Elevation module 209 may then use these average elevation values as the elevation information of the associated thoroughfare segments.

In step 503, the probe data point is matched to the one thoroughfare segment based, at least in part, on the elevation information. The elevation information of the plurality of thoroughfare segments and the probe data point may be used to match the probe data point to one of the thoroughfare segments that is closest in elevation to the probe data point. In one embodiment, step 503 may involve comparison module 211 comparing the difference in elevation between the probe data point and each of the plurality of thoroughfare segments and matching the probe data point to the thoroughfare segment presenting the smallest difference.

In one embodiment, it is contemplated that the steps of process 500 occur at least after steps 351 and 353 of process 350. As described earlier, in step 351a map matching request is received and in step 353 the plurality of thoroughfare segments is determined. Like process 350, process 500 also involves the positioning information for the probe data point and the plurality of thoroughfare segments. By arranging process 500 to begin at least after steps 351 and 353, the process of 350 may be adapted to produce an additional match of the probe data point based on elevation information in addition to determining a match based on a comparison with the edges of the thoroughfare segments. Alternatively, in another embodiment, 2D edge-based map matching platform 175 may cause the steps of process 500 to occur independently of process 350. In this alternative embodiment, equivalent steps to steps 351 and 353 may be added to process 500.

The processes described herein for 2D edge-based map matching may be advantageously implemented via software, hardware, firmware or a combination of software and/or firmware and/or hardware. For example, the processes described herein, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

Figure 6:
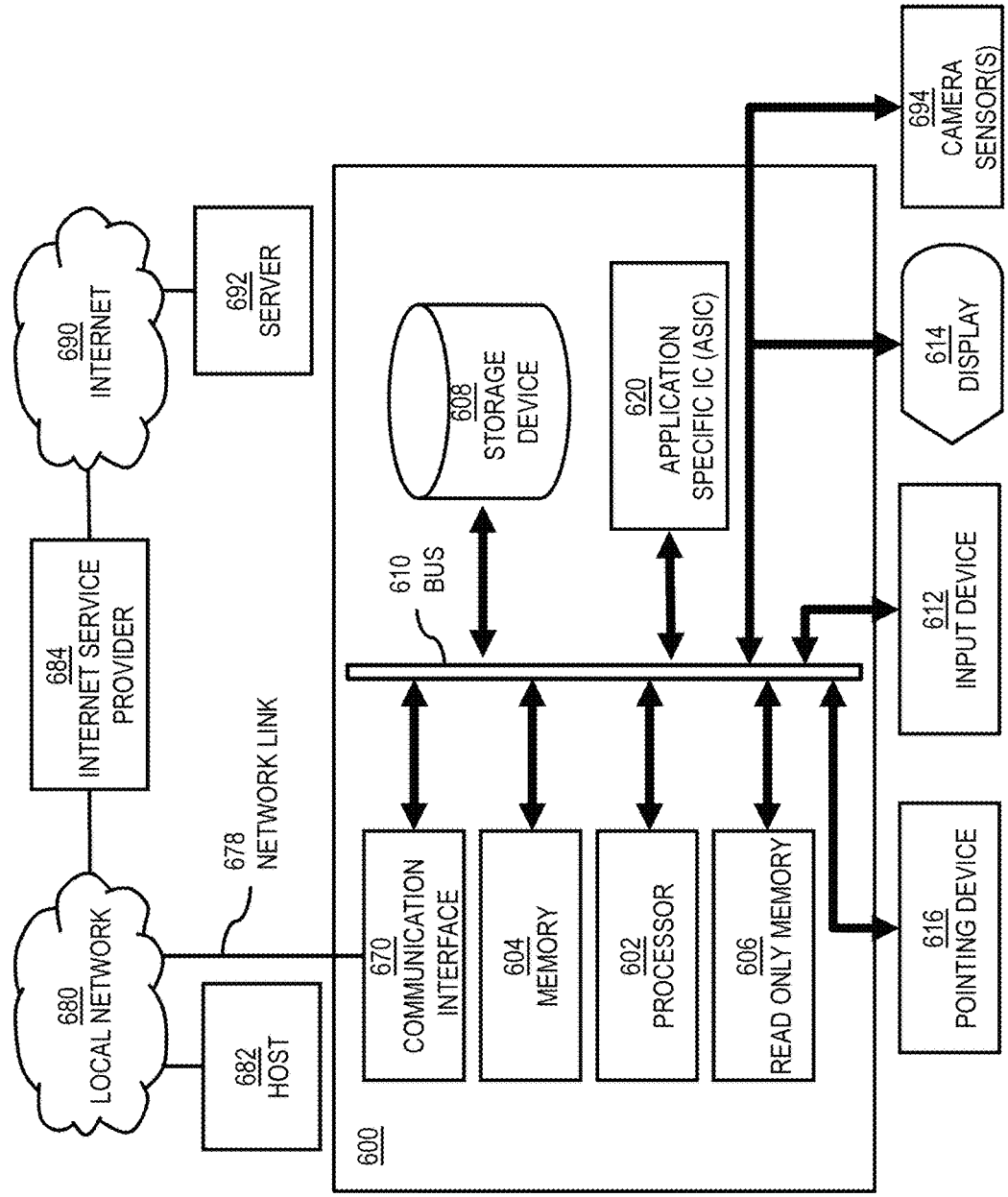
FIG. 6 is a diagram of hardware that can be used to implement an embodiment of the invention.

FIG. 6 illustrates a computer system 600 upon which an embodiment of the invention may be implemented. Although computer system 600 is depicted with respect to a particular device or equipment, it is contemplated that other devices or equipment (e.g., network elements, servers, etc.) within FIG. 6 can deploy the illustrated hardware and components of system 600. Computer system 600 is programmed (e.g., via computer program code or instructions) to 2D edge-based map matching as described herein and includes a communication mechanism such as a bus 610 for passing information between other internal and external components of the computer system 600. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 600, or a portion thereof, constitutes a means for performing one or more steps of 2D edge-based map matching.

A bus 610 includes one or more parallel conductors of information so that information is transferred quickly among devices coupled to the bus 610. One or more processors 602 for processing information are coupled with the bus 610.

A processor (or multiple processors) 602 performs a set of operations on information as specified by computer program code related to 2D edge-based map matching. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 610 and placing information on the bus 610. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 602, such as a sequence of operation codes, constitute processor instructions, also called computer system instructions or, simply, computer instructions. Processors may be implemented as mechanical, electrical, magnetic, optical, chemical, or quantum components, among others, alone or in combination.

Computer system 600 also includes a memory 604 coupled to bus 610. The memory 604, such as a random access memory (RAM) or any other dynamic storage device, stores information including processor instructions for 2D edge-based map matching. Dynamic memory allows information stored therein to be changed by the computer system 600. RAM allows a unit of information stored at a location called a memory address to be stored and retrieved independently of information at neighboring addresses. The memory 604 is also used by the processor 602 to store temporary values during execution of processor instructions. The computer system 600 also includes a read only memory (ROM) 606 or any other static storage device coupled to the bus 610 for storing static information, including instructions, that is not changed by the computer system 600. Some memory is composed of volatile storage that loses the information stored thereon when power is lost. Also coupled to bus 610 is a non-volatile (persistent) storage device 608, such as a magnetic disk, optical disk or flash card, for storing information, including instructions, that persists even when the computer system 600 is turned off or otherwise loses power.

Information, including instructions for 2D edge-based map matching, is provided to the bus 610 for use by the processor from an external input device 612, such as a keyboard containing alphanumeric keys operated by a human user, a microphone, an Infrared (IR) remote control, a joystick, a game pad, a stylus pen, a touch screen, or a sensor. A sensor detects conditions in its vicinity and transforms those detections into physical expression compatible with the measurable phenomenon used to represent information in computer system 600. Other external devices coupled to bus 610, used primarily for interacting with humans, include a display device 614, such as a cathode ray tube (CRT), a liquid crystal display (LCD), a light emitting diode (LED) display, an organic LED (OLED) display, a plasma screen, or a printer for presenting text or images, and a pointing device 616, such as a mouse, a trackball, cursor direction keys, or a motion sensor, for controlling a position of a small cursor image presented on the display 614 and issuing commands associated with graphical elements presented on the display 614, and one or more camera sensors 694 for capturing, recording and causing to store one or more still and/or moving images (e.g., videos, movies, etc.) which also may comprise audio recordings. In some embodiments, for example, in embodiments in which the computer system 600 performs all functions automatically without human input, one or more of external input device 612, display device 614 and pointing device 616 may be omitted.

In the illustrated embodiment, special purpose hardware, such as an application specific integrated circuit (ASIC) 620, is coupled to bus 610. The special purpose hardware is configured to perform operations not performed by processor 602 quickly enough for special purposes. Examples of ASICs include graphics accelerator cards for generating images for display 614, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 600 also includes one or more instances of a communications interface 670 coupled to bus 610. Communication interface 670 provides a one-way or two-way communication coupling to a variety of external devices that operate with their own processors, such as printers, scanners and external disks. In general the coupling is with a network link 678 that is connected to a local network 680 to which a variety of external devices with their own processors are connected. For example, communication interface 670 may be a parallel port or a serial port or a universal serial bus (USB) port on a personal computer. In some embodiments, communications interface 670 is an integrated services digital network (ISDN) card or a digital subscriber line (DSL) card or a telephone modem that provides an information communication connection to a corresponding type of telephone line. In some embodiments, a communication interface 670 is a cable modem that converts signals on bus 610 into signals for a communication connection over a coaxial cable or into optical signals for a communication connection over a fiber optic cable. As another example, communications interface 670 may be a local area network (LAN) card to provide a data communication connection to a compatible LAN, such as Ethernet. Wireless links may also be implemented. For wireless links, the communications interface 670 sends or receives or both sends and receives electrical, acoustic or electromagnetic signals, including infrared and optical signals, that carry information streams, such as digital data. For example, in wireless handheld devices, such as mobile telephones like cell phones, the communications interface 670 includes a radio band electromagnetic transmitter and receiver called a radio transceiver. In certain embodiments, the communications interface 670 enables connection to the communication network 105 for 2D edge-based map matching to the UE 101.

The term "computer-readable medium" as used herein refers to any medium that participates in providing information to processor 602, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 608. Volatile media include, for example, dynamic memory 604. Transmission media include, for example, twisted pair cables, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, an EEPROM, a flash memory, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 620.

Network link 678 typically provides information communication using transmission media through one or more networks to other devices that use or process the information. For example, network link 678 may provide a connection through local network 680 to a host computer 682 or to equipment 684 operated by an Internet Service Provider (ISP). ISP equipment 684 in turn provides data communication services through the public, world-wide packet-switching communication network of networks now commonly referred to as the Internet 690.

A computer called a server host 692 connected to the Internet hosts a process that provides a service in response to information received over the Internet. For example, server host 692 hosts a process that provides information representing video data for presentation at display 614. It is contemplated that the components of system 600 can be deployed in various configurations within other computer systems, e.g., host 682 and server 692.

At least some embodiments of the invention are related to the use of computer system 600 for implementing some or all of the techniques described herein. According to one embodiment of the invention, those techniques are performed by computer system 600 in response to processor 602 executing one or more sequences of one or more processor instructions contained in memory 604. Such instructions, also called computer instructions, software and program code, may be read into memory 604 from another computer-readable medium such as storage device 608 or network link 678. Execution of the sequences of instructions contained in memory 604 causes processor 602 to perform one or more of the method steps described herein. In alternative embodiments, hardware, such as ASIC 620, may be used in place of or in combination with software to implement the invention. Thus, embodiments of the invention are not limited to any specific combination of hardware and software, unless otherwise explicitly stated herein.

The signals transmitted over network link 678 and other networks through communications interface 670, carry information to and from computer system 600. Computer system 600 can send and receive information, including program code, through the networks 680, 690 among others, through network link 678 and communications interface 670. In an example using the Internet 690, a server host 692 transmits program code for a particular application, requested by a message sent from computer 600, through Internet 690, ISP equipment 684, local network 680 and communications interface 670. The received code may be executed by processor 602 as it is received, or may be stored in memory 604 or in storage device 608 or any other non-volatile storage for later execution, or both. In this manner, computer system 600 may obtain application program code in the form of signals on a carrier wave.

Various forms of computer readable media may be involved in carrying one or more sequence of instructions or data or both to processor 602 for execution. For example, instructions and data may initially be carried on a magnetic disk of a remote computer such as host 682. The remote computer loads the instructions and data into its dynamic memory and sends the instructions and data over a telephone line using a modem. A modem local to the computer system 600 receives the instructions and data on a telephone line and uses an infra-red transmitter to convert the instructions and data to a signal on an infra-red carrier wave serving as the network link 678. An infrared detector serving as communications interface 670 receives the instructions and data carried in the infrared signal and places information representing the instructions and data onto bus 610. Bus 610 carries the information to memory 604 from which processor 602 retrieves and executes the instructions using some of the data sent with the instructions. The instructions and data received in memory 604 may optionally be stored on storage device 608, either before or after execution by the processor 602.

FIG. 7 illustrates a chip set or chip 700 upon which an embodiment of the invention may be implemented. Chip set 700 is programmed to perform 2D edge-based map matching as described herein and includes, for instance, the processor and memory components described with respect to FIG. 6 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 700 can be implemented in a single chip. It is further contemplated that in certain embodiments the chip set or chip 700 can be implemented as a single "system on a chip." It is further contemplated that in certain embodiments a separate ASIC would not be used, for example, and that all relevant functions as disclosed herein would be performed by a processor or processors. Chip set or chip 700, or a portion thereof, constitutes a means for performing one or more steps of providing user interface navigation information associated with the availability of functions. Chip set or chip 700, or a portion thereof, constitutes a means for performing one or more steps of 2D edge-based map matching.

In one embodiment, the chip set or chip 700 includes a communication mechanism such as a bus 701 for passing information among the components of the chip set 700. A processor 703 has connectivity to the bus 701 to execute instructions and process information stored in, for example, a memory 705. The processor 703 may include one or more processing cores with each core configured to perform independently. A multi-core processor enables multiprocessing within a single physical package. Examples of a multi-core processor include two, four, eight, or greater numbers of processing cores. Alternatively or in addition, the processor 703 may include one or more microprocessors configured in tandem via the bus 701 to enable independent execution of instructions, pipelining, and multithreading. The processor 703 may also be accompanied with one or more specialized components to perform certain processing functions and tasks such as one or more digital signal processors (DSP) 707, or one or more application-specific integrated circuits (ASIC) 709. A DSP 707 typically is configured to process real-world signals (e.g., sound) in real time independently of the processor 703. Similarly, an ASIC 709 can be configured to performed specialized functions not easily performed by a more general purpose processor. Other specialized components to aid in performing the inventive functions described herein may include one or more field programmable gate arrays (FPGA), one or more controllers, or one or more other special-purpose computer chips.

In one embodiment, the chip set or chip 700 includes merely one or more processors and some software and/or firmware supporting and/or relating to and/or for the one or more processors.

The processor 703 and accompanying components have connectivity to the memory 705 via the bus 701. The memory 705 includes both dynamic memory (e.g., RAM, magnetic disk, writable optical disk, etc.) and static memory (e.g., ROM, CD-ROM, etc.) for storing executable instructions that when executed perform the inventive steps described herein to perform 2D edge-based map matching. The memory 705 also stores the data associated with or generated by the execution of the inventive steps.

Figure 8:
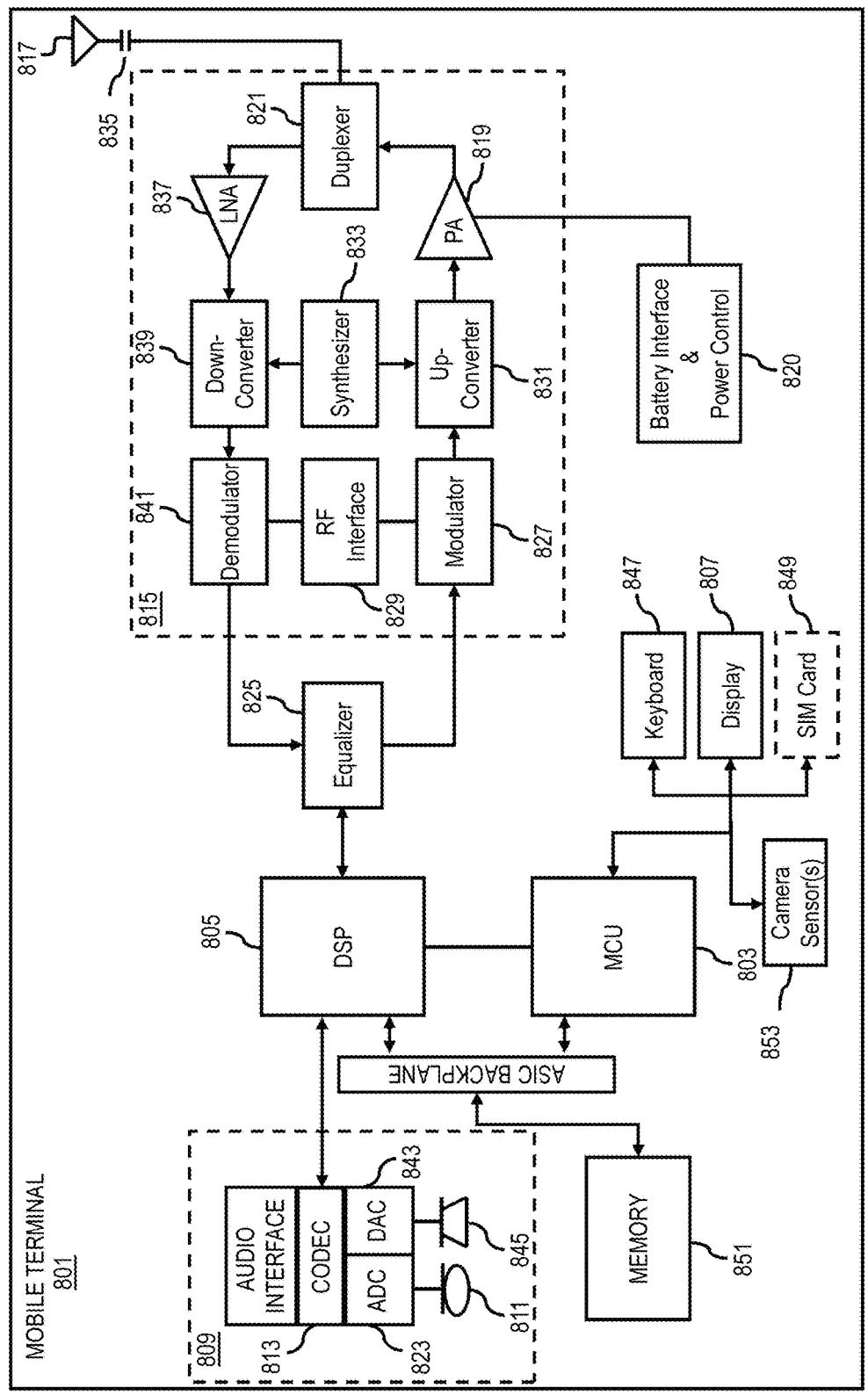
FIG. 8 is a diagram of a mobile terminal (e.g., handset) that can be used to implement an embodiment of the invention.

FIG. 8 is a diagram of exemplary components of a mobile terminal (e.g., handset) for communications, which is capable of operating in the system of FIG. 1, according to one embodiment. In some embodiments, mobile terminal 801, or a portion thereof, constitutes a means for performing one or more steps of 2D edge-based map matching. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 803, a Digital Signal Processor (DSP) 805, and a receiver/transmitter unit including a microphone gain control unit and a speaker gain control unit. A main display unit 807 provides a display to the user in support of various applications and mobile terminal functions that perform or support the steps of 2D edge-based map matching. The display 807 includes display circuitry configured to display at least a portion of a user interface of the mobile terminal (e.g., mobile telephone). Additionally, the display 807 and display circuitry are configured to facilitate user control of at least some functions of the mobile terminal. An audio function circuitry 809 includes a microphone 811 and microphone amplifier that amplifies the speech signal output from the microphone 811. The amplified speech signal output from the microphone 811 is fed to a coder/decoder (CODEC) 813.

A radio section 815 amplifies power and converts frequency in order to communicate with a base station, which is included in a mobile communication system, via antenna 817. The power amplifier (PA) 819 and the transmitter/modulation circuitry are operationally responsive to the MCU 803, with an output from the PA 819 coupled to the duplexer 821 or circulator or antenna switch, as known in the art. The PA 819 also couples to a battery interface and power control unit 820.

In use, a user of mobile terminal 801 speaks into the microphone 811 and his or her voice along with any detected background noise is converted into an analog voltage. The analog voltage is then converted into a digital signal through the Analog to Digital Converter (ADC) 823. The control unit 803 routes the digital signal into the DSP 805 for processing therein, such as speech encoding, channel encoding, encrypting, and interleaving. In one embodiment, the processed voice signals are encoded, by units not separately shown, using a cellular transmission protocol such as enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like, or any combination thereof.

The encoded signals are then routed to an equalizer 825 for compensation of any frequency-dependent impairments that occur during transmission though the air such as phase and amplitude distortion. After equalizing the bit stream, the modulator 827 combines the signal with a RF signal generated in the RF interface 829. The modulator 827 generates a sine wave by way of frequency or phase modulation. In order to prepare the signal for transmission, an up-converter 831 combines the sine wave output from the modulator 827 with another sine wave generated by a synthesizer 833 to achieve the desired frequency of transmission. The signal is then sent through a PA 819 to increase the signal to an appropriate power level. In practical systems, the PA 819 acts as a variable gain amplifier whose gain is controlled by the DSP 805 from information received from a network base station. The signal is then filtered within the duplexer 821 and optionally sent to an antenna coupler 835 to match impedances to provide maximum power transfer. Finally, the signal is transmitted via antenna 817 to a local base station. An automatic gain control (AGC) can be supplied to control the gain of the final stages of the receiver. The signals may be forwarded from there to a remote telephone which may be another cellular telephone, any other mobile phone or a land-line connected to a Public Switched Telephone Network (PSTN), or other telephony networks.

Voice signals transmitted to the mobile terminal 801 are received via antenna 817 and immediately amplified by a low noise amplifier (LNA) 837. A down-converter 839 lowers the carrier frequency while the demodulator 841 strips away the RF leaving only a digital bit stream. The signal then goes through the equalizer 825 and is processed by the DSP 805. A Digital to Analog Converter (DAC) 843 converts the signal and the resulting output is transmitted to the user through the speaker 845, all under control of a Main Control Unit (MCU) 803 which can be implemented as a Central Processing Unit (CPU).

The MCU 803 receives various signals including input signals from the keyboard 847. The keyboard 847 and/or the MCU 803 in combination with other user input components (e.g., the microphone 811) comprise a user interface circuitry for managing user input. The MCU 803 runs a user interface software to facilitate user control of at least some functions of the mobile terminal 801 to perform a 2D edge-based map matching. The MCU 803 also delivers a display command and a switch command to the display 807 and to the speech output switching controller, respectively. Further, the MCU 803 exchanges information with the DSP 805 and can access an optionally incorporated SIM card 849 and a memory 851. In addition, the MCU 803 executes various control functions required of the terminal. The DSP 805 may, depending upon the implementation, perform any of a variety of conventional digital processing functions on the voice signals. Additionally, DSP 805 determines the background noise level of the local environment from the signals detected by microphone 811 and sets the gain of microphone 811 to a level selected to compensate for the natural tendency of the user of the mobile terminal 801.

The CODEC 813 includes the ADC 823 and DAC 843. The memory 851 stores various data including call incoming tone data and is capable of storing other data including music data received via, e.g., the global Internet. The software module could reside in RAM memory, flash memory, registers, or any other form of writable storage medium known in the art. The memory device 851 may be, but not limited to, a single memory, CD, DVD, ROM, RAM, EEPROM, optical storage, magnetic disk storage, flash memory storage, or any other non-volatile storage medium capable of storing digital data.

An optionally incorporated SIM card 849 carries, for instance, important information, such as the cellular phone number, the carrier supplying service, subscription details, and security information. The SIM card 849 serves primarily to identify the mobile terminal 801 on a radio network. The card 849 also contains a memory for storing a personal telephone number registry, text messages, and user specific mobile terminal settings.

Further, one or more camera sensors 853 may be incorporated onto the mobile station 801 wherein the one or more camera sensors may be placed at one or more locations on the mobile station. Generally, the camera sensors may be utilized to capture, record, and cause to store one or more still and/or moving images (e.g., videos, movies, etc.) which also may comprise audio recordings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method, comprising:
   matching at least one probe data point to one of a plurality of thoroughfare segments, wherein the at least one probe data point is captured by way of map matching or geo-coding techniques that factor in velocity and bearing information for positional accuracy;
   determining respective edges of the plurality of thoroughfare segments based on a respective width of the thoroughfare segments, wherein the respective edges extend along sides of centerlines of the thoroughfare segments;
   matching the at least one probe data point to the one thoroughfare segment based, at least in part, on a comparison of the at least one probe data point to the respective edges of the plurality of thoroughfare segments;
   determining first distances from the at least one probe data point to the centerlines of the plurality of thoroughfare segments; and
   determining second distances from the centerlines to the respective edges of the plurality of thoroughfare segments,
   wherein the comparison is based, at least in part, on subtracting the second distances from the first distances,
   wherein the plurality of thoroughfare segments is substantially parallel, and
   wherein the at least one probe data point lies between the centerlines of the plurality of thoroughfare segments, and wherein one or more of the plurality of thoroughfare segments that exceeds a threshold distance from the at least one probe data point or is separated from the at least one probe data point by one or more other thoroughfare segments is discarded.

2. The method of claim 1, further comprising:
   determining the plurality of thoroughfare segments based, at least in part, on the plurality of thoroughfare segments being proximate to the at least one probe data point among a network of thoroughfare segments.

3. The method of claim 1, wherein the at least one probe data point is matched to the one thoroughfare segment based, at least in part, on a smallest distance.

4. The method of claim 1, further comprising:
   determining respective edges of the plurality of thoroughfare segments based on respective numbers of lanes of the plurality of thoroughfare segments multiplied by a lane width.

5. The method of claim 1, further comprising:
   determining elevation information associated with the plurality of thoroughfare segments, the at least one probe data point, or a combination thereof,
   wherein the matching of the at least one probe data point to the one thoroughfare segment is based on the elevation information.

6. The method of claim 5, further comprising:
   determining the elevation information of one or more of the plurality of thoroughfare segments based, at least in part, on an average elevation of one or more other probe data points associated with the plurality of thoroughfare segments.

7. The method of claim 1, wherein the respective edges of the plurality of thoroughfare segments are respective edges of each of the plurality of thoroughfare segments proximate to the at least one probe data point.

8. An apparatus comprising:
at least one processor; and
at least one memory including computer program code for one or more programs,
the at least one memory and the computer program code configured to, with the at least one processor, cause the apparatus to perform at least the following,
receive at least one request to match at least one probe data point to one of a plurality of thoroughfare segments, wherein the at least one probe data point is captured by way of map matching or geo-coding techniques that factor in velocity and bearing information for positional accuracy;
determine respective edges of the plurality of thoroughfare segments based on a respective width of the thoroughfare segments, wherein the respective edges extend along sides of centerlines of the thoroughfare segments;
cause, at least in part, a matching of the at least one probe data point to the one thoroughfare segment based, at least in part, on a comparison of the at least one probe data point to the respective edges of the plurality of thoroughfare segments;
determining first distances from the at least one probe data point to the centerlines of the plurality of thoroughfare segments; and
determining second distances from the centerlines to the respective edges of the plurality of thoroughfare segments,
wherein the comparison is based, at least in part, on subtracting the second distances from the first distances,
wherein the plurality of thoroughfare segments is substantially parallel, and
wherein the at least one probe data point lies between the centerlines of the plurality of thoroughfare segments, and wherein one or more of the plurality of thoroughfare segments exceeds a threshold distance from the at least one probe data point or is separated from the at least one probe data point by one or more other thoroughfare segments is discarded.

9. An apparatus of claim 8, wherein the apparatus is further caused to:
determine the plurality of thoroughfare segments based, at least in part, on the plurality of thoroughfare segments being proximate to the at least one probe data point among a network of thoroughfare segments.

10. An apparatus of claim 8, wherein the at least one probe data point is matched to the one thoroughfare segment based, at least in part, on a smallest distance.

11. An apparatus of claim 8, wherein the apparatus is further caused to:
determine respective edges of the plurality of thoroughfare segments based, at least in part, on respective numbers of lanes of the plurality of thoroughfare segments multiplied by a lane width.

12. An apparatus of claim 8, wherein the apparatus is further caused to:
determine elevation information associated with the plurality of thoroughfare segments, the at least one probe data point, or a combination thereof,
wherein the matching of the at least one probe data point to the one thoroughfare segment is based, at least in part, on the elevation information.

13. An apparatus of claim 12, wherein the apparatus is further caused to:
determine the elevation information of one or more of the plurality of thoroughfare segments based, at least in part, on an average elevation of one or more other probe data points associated with the plurality of thoroughfare segments.

14. An apparatus of claim 8, wherein the respective edges of the plurality of thoroughfare segments are respective edges of each of the plurality of thoroughfare segments proximate to the at least one probe data point.

* * * * *